US012493832B2

(12) United States Patent
Fukushima

(10) Patent No.: US 12,493,832 B2
(45) Date of Patent: Dec. 9, 2025

(54) CHECK-IN SYSTEM, CHECK-IN METHOD AND PROGRAM

(71) Applicant: Rakuten Group, Inc., Tokyo (JP)

(72) Inventor: Sachiko Fukushima, Tokyo (JP)

(73) Assignee: Rakuten Group, Inc., Tokyo (JP)

( * ) Notice: Subject to any disclaimer, the term of this patent is extended or adjusted under 35 U.S.C. 154(b) by 0 days.

(21) Appl. No.: 17/785,340

(22) PCT Filed: Mar. 31, 2021

(86) PCT No.: PCT/JP2021/014022
§ 371 (c)(1),
(2) Date: Jun. 14, 2022

(87) PCT Pub. No.: WO2022/208806
PCT Pub. Date: Oct. 6, 2022

(65) Prior Publication Data
US 2024/0193491 A1    Jun. 13, 2024

(51) Int. Cl.
*G06Q 10/02* (2012.01)
*G06K 19/06* (2006.01)
*G06Q 20/40* (2012.01)

(52) U.S. Cl.
CPC ....... *G06Q 10/02* (2013.01); *G06K 19/06037* (2013.01); *G06Q 20/40145* (2013.01)

(58) Field of Classification Search
CPC ............. G06Q 10/02; G06Q 20/40145; G06K 19/06037

USPC ............................................................ 705/5
See application file for complete search history.

(56) References Cited

U.S. PATENT DOCUMENTS

2020/0126171 A1\* 4/2020 Jabara ................ G06Q 20/3278
2020/0311730 A1   10/2020 Yamada
2022/0148009 A1\* 5/2022 Vyas ................... G06Q 30/0185

FOREIGN PATENT DOCUMENTS

JP    2020-160689 A    10/2020

OTHER PUBLICATIONS

"Mobile-based In-Room Check-in System for Optimizing Check-in Process at the Sultan Hotel and Residence Jakarta" Published by IEEE (Year: 2019).\*

\* cited by examiner

*Primary Examiner* — Zeina Elchanti
(74) *Attorney, Agent, or Firm* — Sughrue Mion, PLLC

(57) ABSTRACT

The at least one processor of a check-in system acquires, when a user of a first service visits a location relating to a second service, first information for identifying the user in the first service by using at least one of a user terminal of the user or a check-in terminal of the location. The at least one processor executes check-in to the location based on the first information or second information associated with the first information.

21 Claims, 21 Drawing Sheets

FIG.4
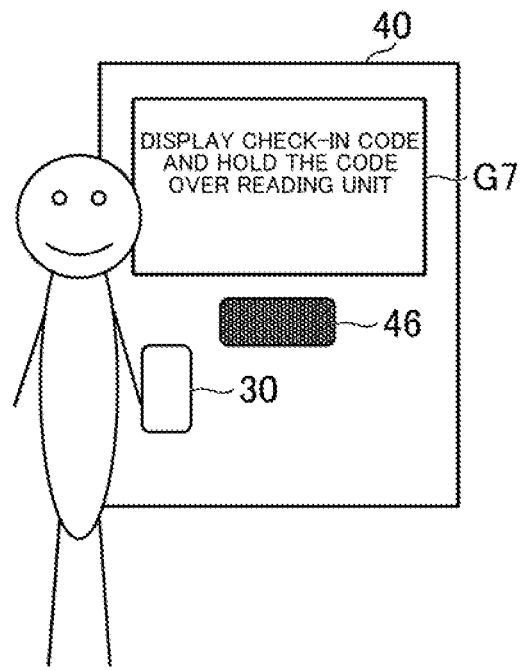
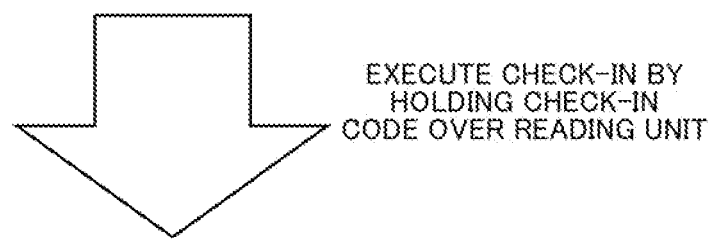
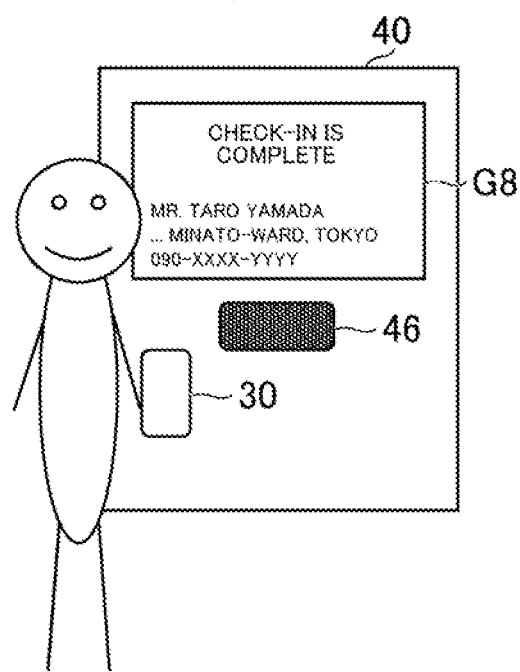

FIG.6

| USER ID | PASSWORD | CODE ID | EXPIRATION TIME | FULL NAME | USAGE STATUS | ... |
|---|---|---|---|---|---|---|
| taro.yamada123 | ******** | 1382 0415 8913 4321 | 2021/3/26 13:35 | TARO YAMADA | GROUP INFORMATION 1, FRIEND INFORMATION 1, TALK INFORMATION 1 | ... |
| hanako999 | ****** | 2521 3921 1542 9916 | 2021/3/26 10:02 | HANAKO ITO | GROUP INFORMATION 2, FRIEND INFORMATION 2, TALK INFORMATION 2 | ... |
| yoshida111jiro | ********** | 7514 9413 0126 8342 | 2021/3/26 16:25 | JIRO YOSHIDA | GROUP INFORMATION 3, FRIEND INFORMATION 3, TALK INFORMATION 3 | ... |
| . | . | . | . | . | . | . |

| USER ID | PASSWORD | FULL NAME | HOTEL | CHECK-IN DATE | APPLICATION ENTRY INFORMATION ||||| CHECK-IN INFORMATION |||
| | | | | | CHECK-OUT DATE | FULL NAME OF GUEST | ADDRESS | TELEPHONE NUMBER | ... | CHECK-IN ENTRY /ABSENCE | CHECK-IN DATE AND TIME | ... |
|---|---|---|---|---|---|---|---|---|---|---|---|---|
| taroyamada123 | ******* | TARO YAMADA | HOTEL BBB | 2021/3/26 | 2021/3/28 | TARO YAMADA | MINATO-WARD, TOKYO | 090-XXXX-YYYY | ... | EXISTS /ABSCENCE | 2021/3/26 17:25 F1 | ... |
| hanako999 | ***** | HANAKO ITO | HOTEL CCC | 2021/4/10 | 2021/4/11 | HANAKO ITO | YOKOHAMA-CITY, KANAGAWA | 080-AAAA-BBBB | ... | - | - | ... |
| yoshida11jiro | ********** | JIRO YOSHIDA | HOTEL DDD | 2021/4/2 | 2021/4/5 | JIRO YOSHIDA | SETAGAYA-WARD, TOKYO | 03-CCCC-DDDD | ... | - | - | ... |
| ... | ... | ... | ... | ... | ... | ... | ... | ... | ... | ... | ... | ... |

DB2

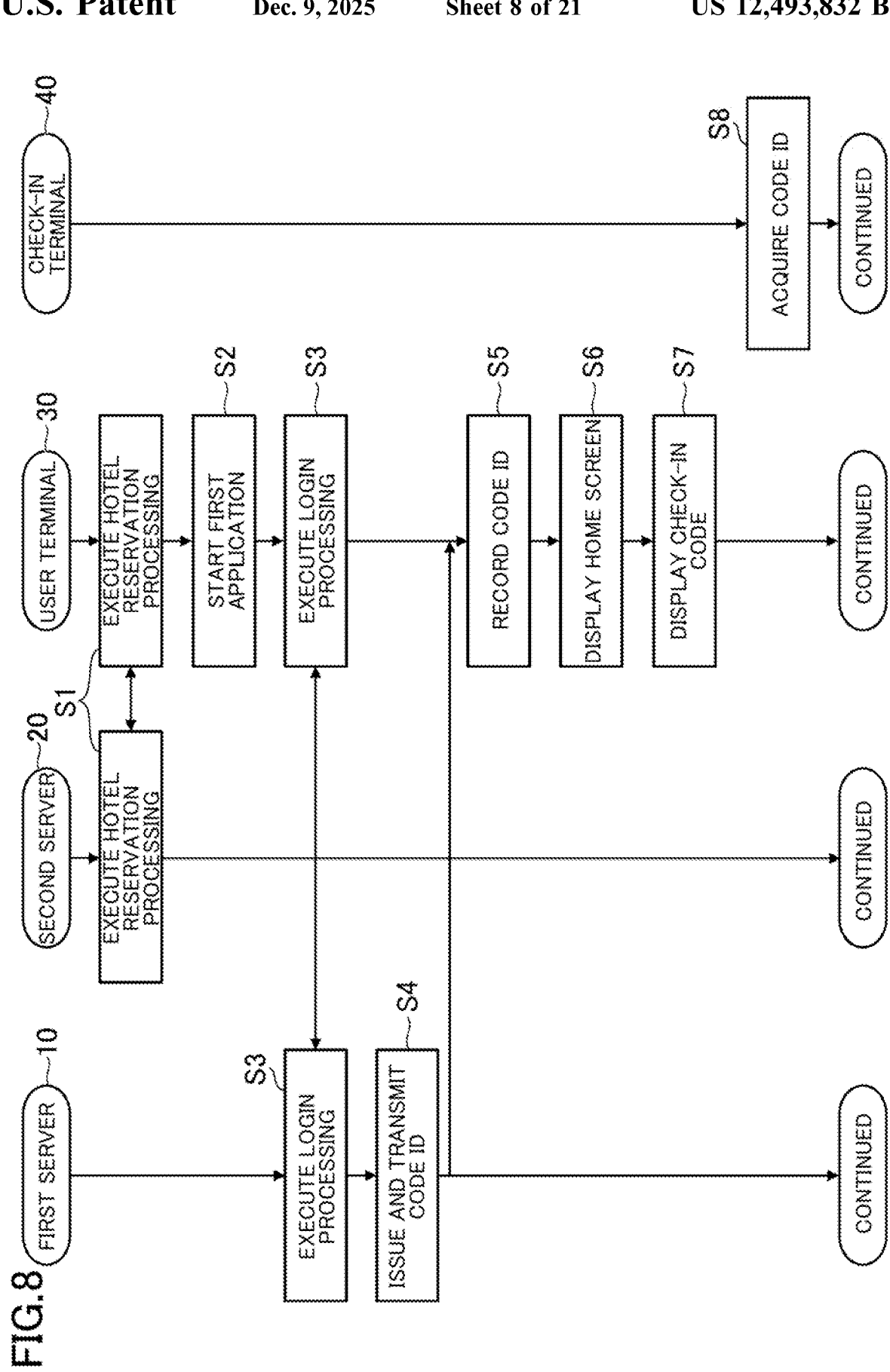

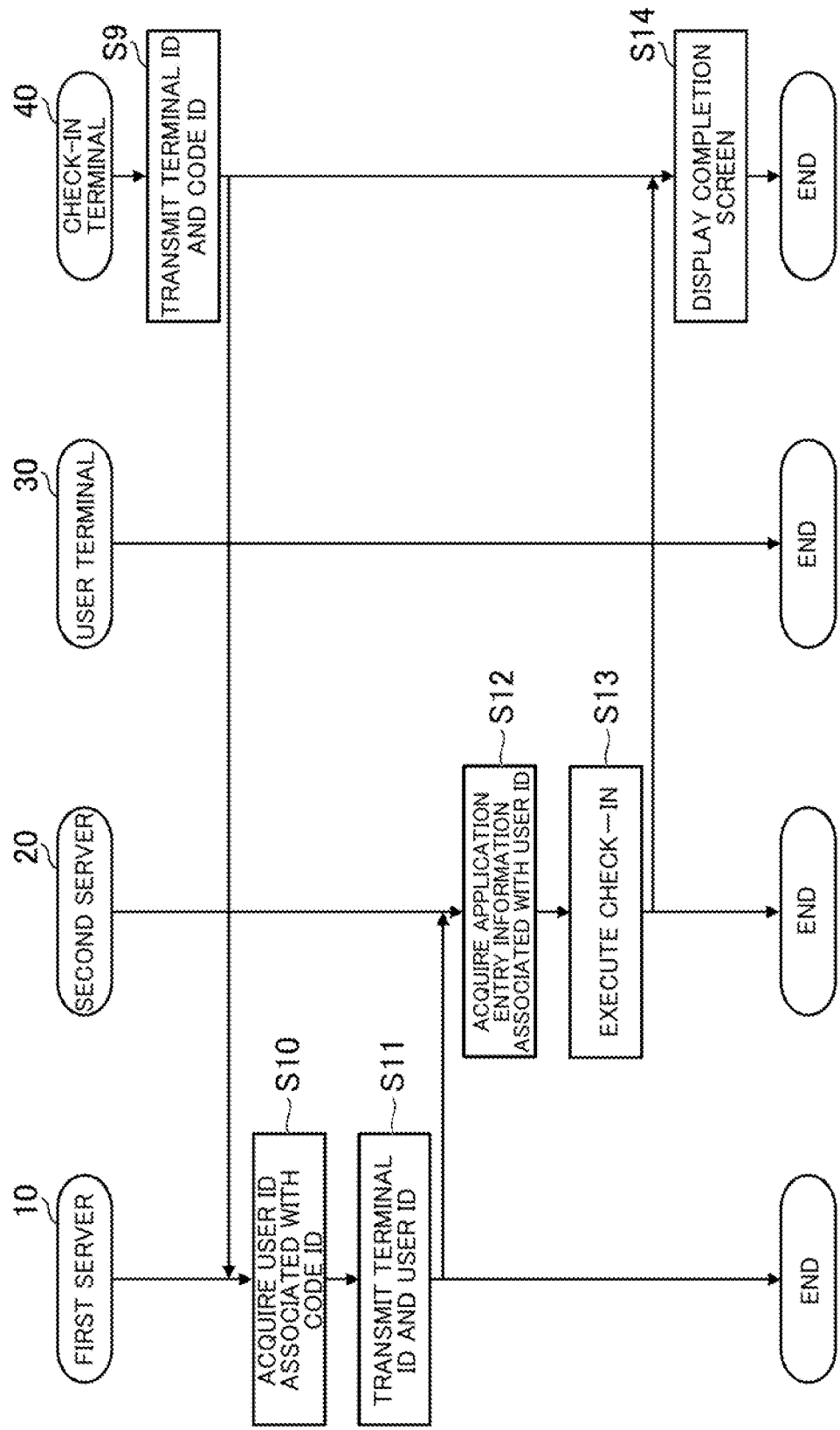

FIG.19
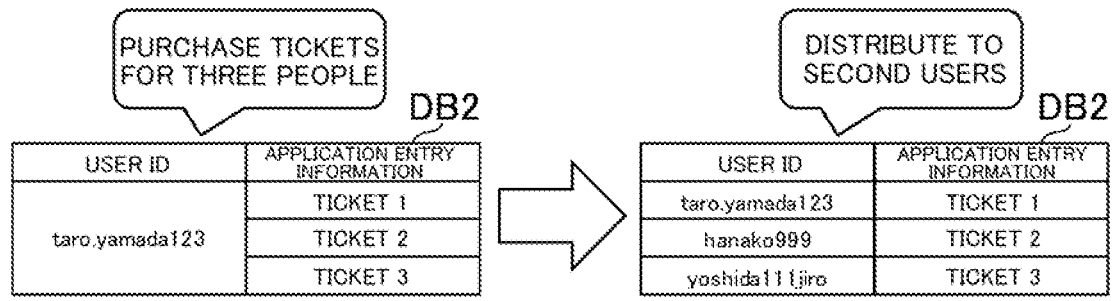
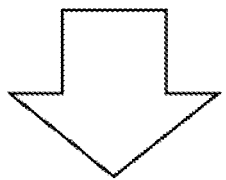
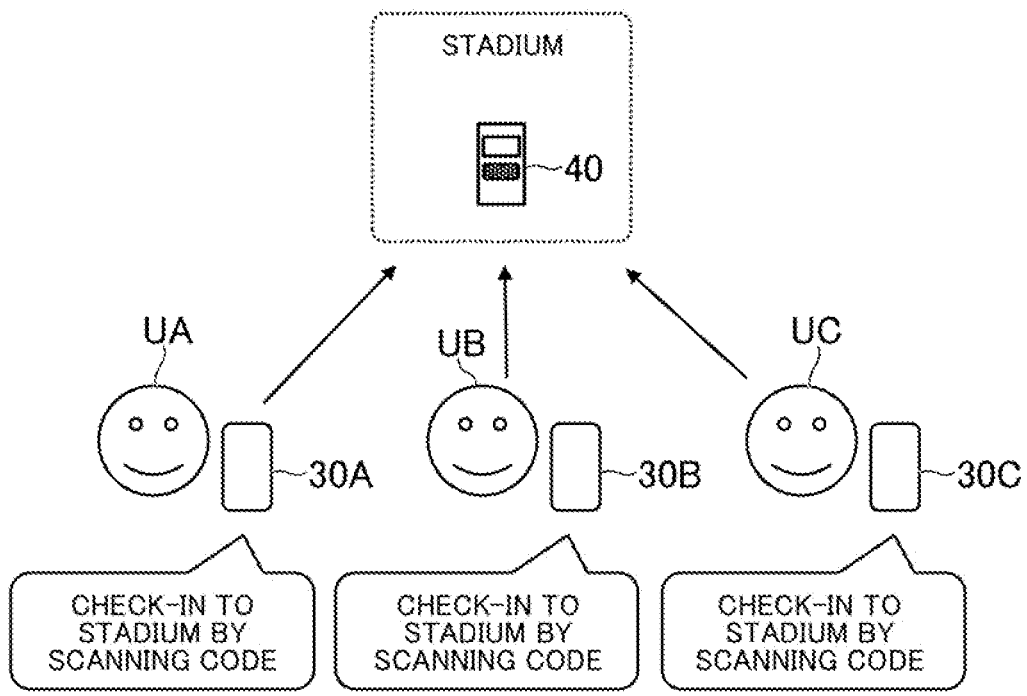

CHECK-IN SYSTEM, CHECK-IN METHOD AND PROGRAM

CROSS REFERENCE TO RELATED APPLICATIONS

This application is a National Stage of International Application No. PCT/JP2021/014022 filed Mar. 31, 2021.

TECHNICAL FIELD

The present disclosure relates to a check-in system, a check-in method, and a program.

BACKGROUND ART

Hitherto, there has been known a technology for enabling a user to check in to a location visited by the user. For example, in Patent Literature 1, there is described a check-in service for enabling a user to check in to a restaurant by displaying a two-dimensional code on a restaurant application installed on a user terminal and reading the two-dimensional code by a terminal arranged in the restaurant.

CITATION LIST

Patent Literature

[PTL 1] JP 2020-160689 A

SUMMARY OF INVENTION

Technical Problem

However, in the technology as described in Patent Literature 1, the user can check in only to restaurants which are members of a check-in service that is usable from the restaurant application, and cannot check-in to restaurants from other services. In the related art, the user is required to manage information on a service-by-service basis, and therefore it is complicated to manage the information required for check-in.

One object of the present disclosure is to simplify management of information required for checking-in to a location visited by a user.

Solution to Problem

According to one aspect of the present disclosure, there is provided a check-in system including: acquisition means for acquiring, when a user of a first service visits a location relating to a second service, first information for identifying the user in the first service by using at least one of a user terminal of the user or a check-in terminal of the location; and check-in execution means for executing check-in to the location based on the first information or second information associated with the first information.

Advantageous Effects of Invention

According to the present disclosure, it is possible to simplify the management of the information required for checking-in to the location visited by the user.

BRIEF DESCRIPTION OF DRAWINGS

FIG. 4 is a diagram for illustrating an example of how a user visits a hotel and checks in to the hotel in the first embodiment.

FIG. 6 is a table for showing a data storage example of a first database.

FIG. 7 is a table for showing a data storage example of a second database.

FIG. 8 is a flow chart for illustrating an example of processing to be executed by the check-in system according to the first embodiment.

FIG. 9 is a flow chart for illustrating the example of processing to be executed by the check-in system according to the first embodiment.

FIG. 19 is a diagram for illustrating an example of a check-in system according to Modification Example 5 of the present disclosure.

DESCRIPTION OF EMBODIMENTS

1. First Embodiment

Now, an example of a check-in system according to a first embodiment of the present disclosure is described.

[1-1. Overall Configuration of Check-In System]

Figure 1:
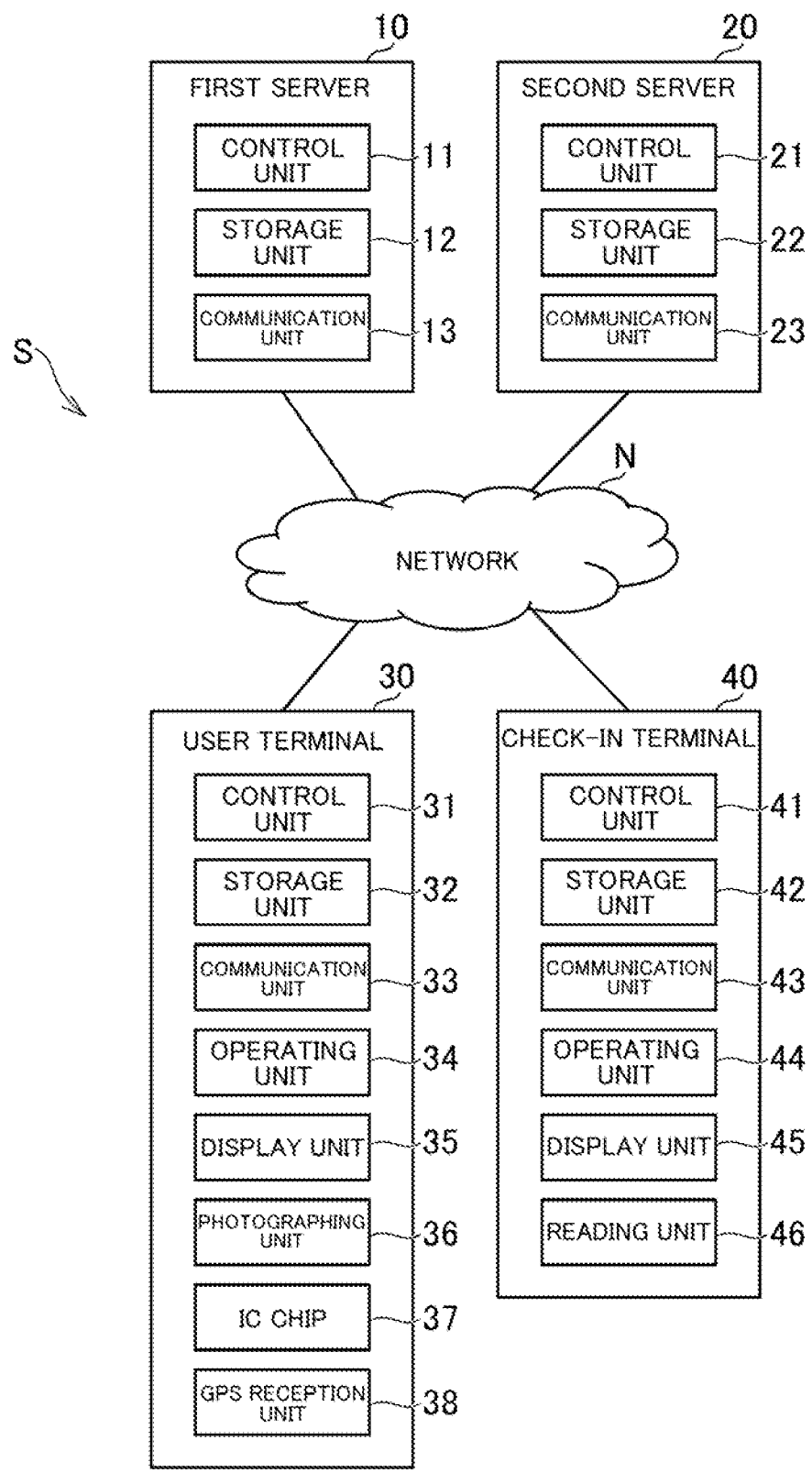
FIG. 1 is a diagram for illustrating an example of an overall configuration of a check-in system according to a first embodiment of the present disclosure.

FIG. 1 is a diagram for illustrating an example of an overall configuration of the check-in system according to the first embodiment. As illustrated in FIG. 1, a check-in system S includes a first server 10, a second server 20, a user terminal 30, and a check-in terminal 40. Each of the first server 10, the second server 20, the user terminal 30, and the check-in terminal 40 can be connected to a network N such as the Internet. It suffices that the check-in system S includes at least one computer, and is not limited to the example illustrated in FIG. 1.

The first server 10 is a server computer of a first service. In the first embodiment, a social networking service (SNS) is taken as an example of the first service. The first service may be any service, and is not limited to the example in the first embodiment. Examples to which other services are applied are described later in a second embodiment and modification examples of the present disclosure.

The first server 10 includes a control unit 11, a storage unit 12, and a communication unit 13. The control unit 11 includes at least one processor. The storage unit 12 includes a volatile memory such as a RAM, and a nonvolatile memory such as a hard disk drive. The communication unit 13 includes at least one of a communication interface for wired communication or a communication interface for wireless communication.

The second server 20 is a server computer for a second service. In the first embodiment, a travel reservation service is described as an example of the second service. The second service is a service that can be linked to the first service. The second service is a service different from the first service. The second service is not limited to the example in the first embodiment. Examples to which other services are applied are described later in the second embodiment and the modification examples. The second server 20 includes a control unit 21, a storage unit 22, and a communication unit 23. Physical configurations of the control unit 21, the storage unit 22, and the communication unit 23 are the same as those of the control unit 11, the storage unit 12, and the communication unit 13, respectively.

The user terminal 30 is a computer to be operated by a user. For example, the user terminal 30 is a smartphone, a tablet terminal, a wearable terminal, or a personal computer. The user terminal 30 includes a control unit 31, a storage unit 32, a communication unit 33, an operation unit 34, a display unit 35, a photographing unit 36, an IC chip 37, and a GPS reception unit 38. Physical configurations of the control unit 31, the storage unit 32, and the communication unit 33 are the same as those of the control unit 11, the storage unit 12, and the communication unit 13, respectively.

The operation unit 34 is an input device such as a touch panel. The display unit 35 is a liquid crystal display or an organic EL display. The photographing unit 36 includes at least one camera. The IC chip 37 may be a chip of any standards, for example, a chip of Felica (trademark) or a chip of a so-called Type A or Type B among the non-contact type standards. The GPS reception unit 38 includes a receiver which receives signals from satellites. The GPS reception unit 38 is used to acquire a current position or a current date and time.

The check-in terminal 40 is a computer arranged in a facility which can be reserved from the second service. For example, the check-in terminal 40 is a personal computer, a tablet terminal, or a smartphone. The check-in terminal 40 includes a control unit 41, a storage unit 42, a communication unit 43, an operation unit 44, a display unit 45, and a reading unit 46. Physical configurations of the control unit 41, the storage unit 42, the communication unit 43, the operation unit 44, and the display unit 45 are the same as those of the control unit 11, the storage unit 12, the communication unit 13, the operation unit 34, and the display unit 35, respectively. The reading unit 46 includes a code reader or a camera. The reading unit 46 may be connected to the outside of the check-in terminal 40.

At least one of programs or data stored in the first server 10, the second server 20, the user terminal 30, and the check-in terminal 40 may be supplied thereto via the network N. Further, each of the first server 10, the second server 20, the user terminal 30, and the check-in terminal 40 may include at least one of a reading unit (e.g., an optical disc drive or a memory card slot) for reading a computer-readable information storage medium, or an input/output unit (e.g., a USB port) for inputting and outputting data to/from an external device. For example, at least one of the program or the data stored in the information storage medium may be supplied through intermediation of at least one of the reading unit or the input/output unit.

[1-2. Outline of Check-In System of First Embodiment]

In the first embodiment, a case in which a user checks in to a hotel reserved from the second service is taken as an example. For example, a user ID and a password which are common to the first service and the second service are used. The user can log in to both the first service and the second service by using one set of the user ID and the password. First, the user logs in to the second service and reserves a hotel.

Figure 2:
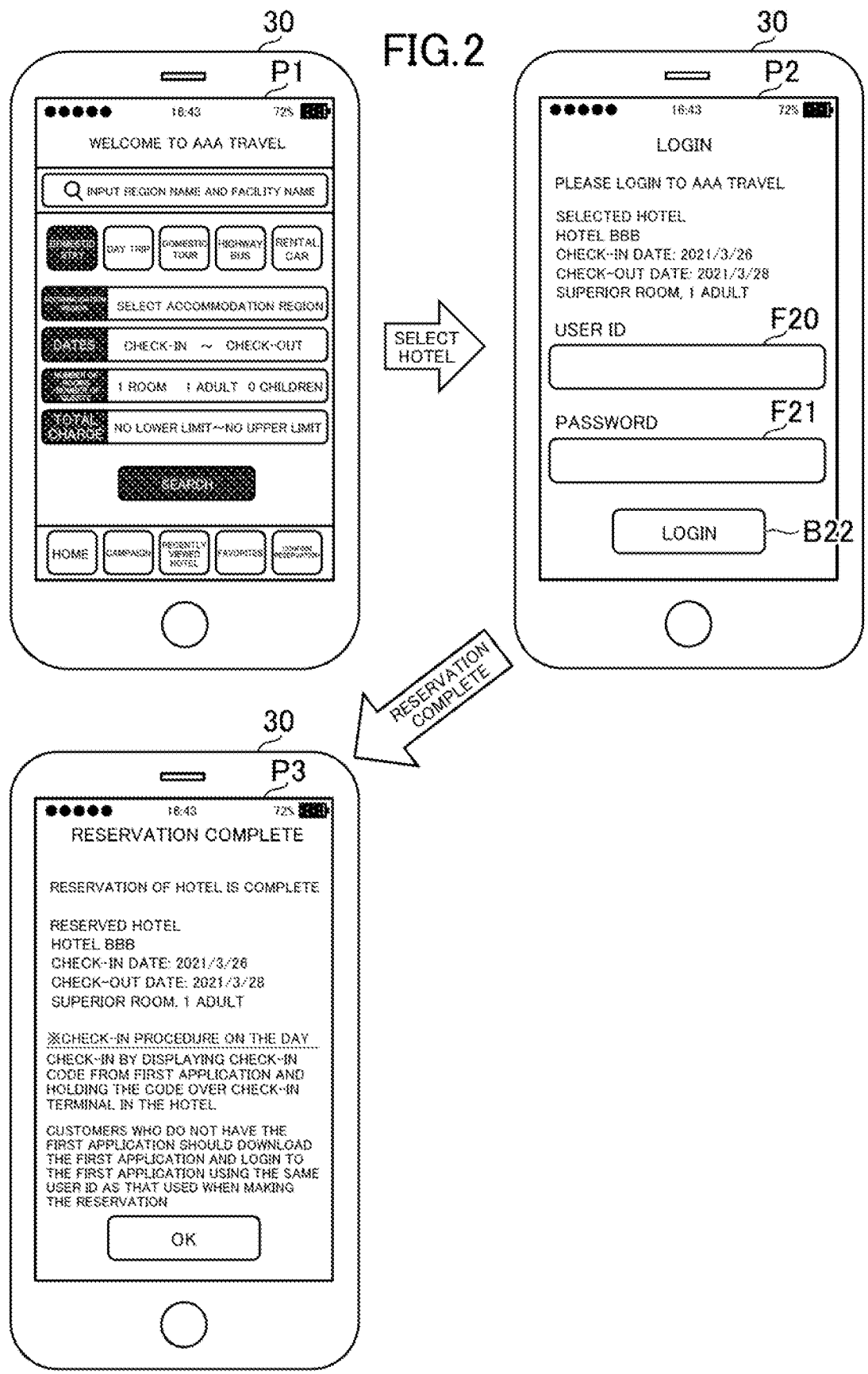
FIG. 2 is a diagram for illustrating an example of a procedure for reserving a hotel from a second service in the first embodiment.

FIG. 2 is a diagram for illustrating an example of a procedure for reserving a hotel from the second service in the first embodiment. As illustrated in FIG. 2, when the user accesses the second server 20 from the user terminal 30, a top page P1 of the second service is displayed. In the first embodiment, a case in which the user uses the second service from a browser is described, but the user may use the second service from a second application, which is the application of the second service. The second application can be installed on the user terminal 30.

The user inputs any search condition on the top page P1 and searches for a desired hotel. When the desired hotel is retrieved and the user inputs information required for reservation, a login page P2 of the second service is displayed. The user logs in to the second service by inputting the user ID and the password in the input forms F20 and F21, respectively, and selecting the button B22, and then the hotel reservation is completed. On the user terminal 30, a reservation completion page P3 indicating that the hotel reservation is complete is displayed.

The reservation completion page P3 provides information on reservation contents of the user and the check-in method on the day. As shown on the reservation completion page P3, the user checks in to the hotel by using the first application, which is the application of the first service. The first application is installed on the user terminal 30. The user may use the first service from a browser. In this case, check-in may be executed by using the browser screen.

Figure 3:
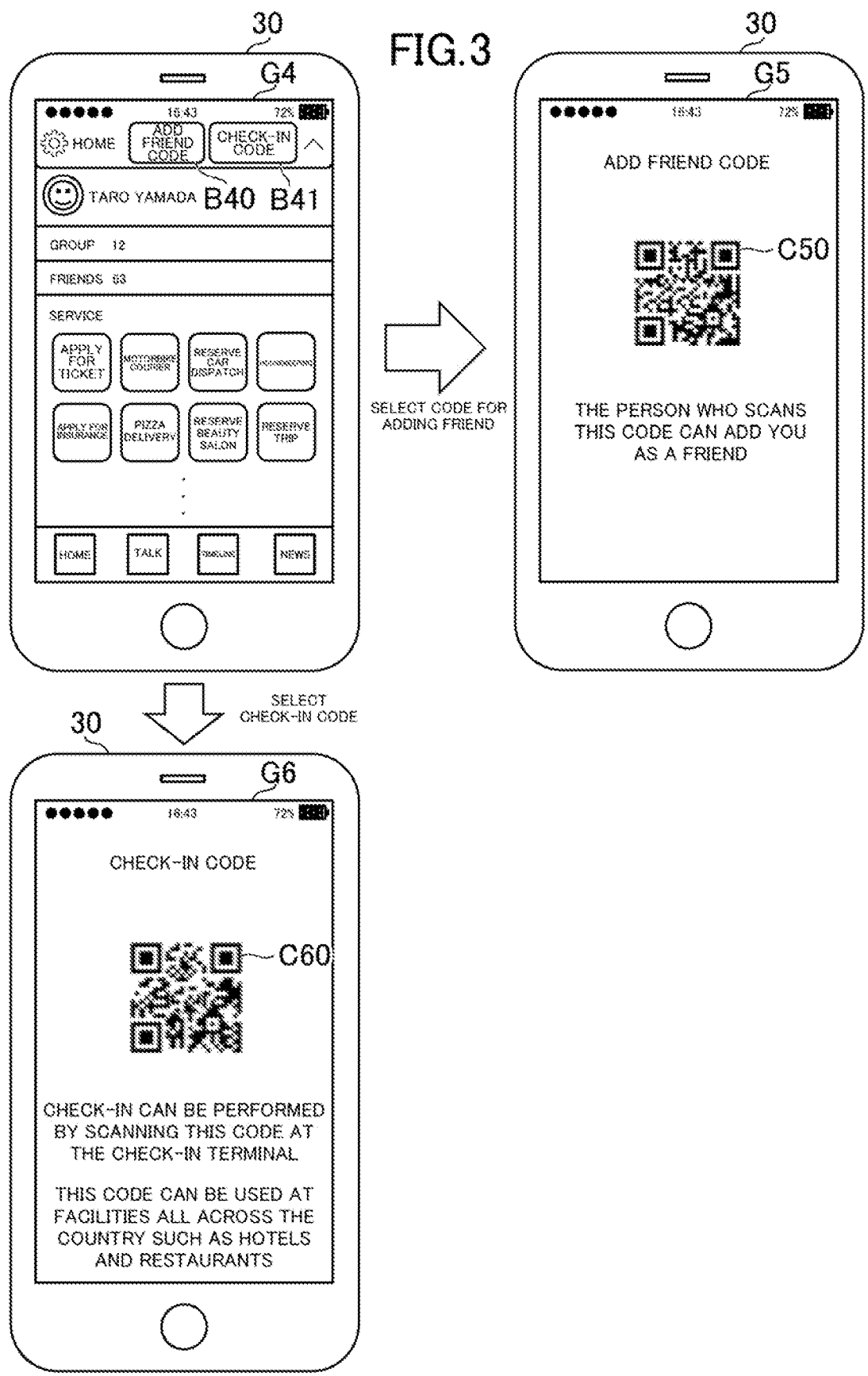
FIG. 3 is a diagram for illustrating an example of screens to be displayed from a first application in the first embodiment.

FIG. 3 is a diagram for illustrating an example of screens to be displayed from the first application in the first embodiment. When the user operates the user terminal 30 to activate the first application, processing for logging in to the first service is executed between the first server 10 and the user terminal 30. The user ID and the password may be requested to be input at a timing at which the first application is activated. In the first embodiment, a case in which the input of the user ID and the password is omitted because the user has already logged in to the first service before is described.

As illustrated in FIG. 3, when the user logs in to the first service, a home screen G4 of the first application is displayed. For example, the user can use the first service by selecting another user from the home screen G4 and transmitting a message or by adding another user as a friend from the home screen G4. The home screen G4 includes a button B40 for displaying a code for the first service and a button B41 for displaying a code for the second service.

When the user selects the button B40, a display screen G5 including a code C50 for the first service is displayed. For example, the code C50 is used to add a friend in the first service. When the code C50 displayed by a certain user A is read by the user terminal 30 of another user B, the another user B can add the user A as a friend. The code C50 may also be used for another purpose in the first service.

The code C50 includes an ID that can identify the user in the first service. This ID may be the user ID described above, but in the first embodiment, a case in which information different from the user ID is used is described. This ID is hereinafter referred to as "code ID." An expiration time is set for the code ID. When the expiration time of a certain code ID is reached, the first server 10 issues a new code ID to update the code ID and the expiration time. The code ID and the expiration time are held in the first server 10 in association with the user ID. The expiration time is not required to be set for the code ID. The code C50 may include information other than the code ID.

When the user selects the button B41, a display screen G6 including a code C60 for check-in is displayed on the display unit 35. The code C60 includes a code ID. The code C60 may include information other than the code ID. Further, the code ID included in the code C50 and the code ID included in the code C60 may differ from each other. That is, a plurality of code IDs may be issued. As shown on the display screen G6, the code C60 can be used for check-in to hotels nationwide. The code C60 can also be used for check-in to facilities other than the hotels. When the user visits the hotel on the day of the stay, the user activates the first application to display the code C60 on the display screen G.

FIG. 4 is a diagram for illustrating an example of how a user visits a hotel and checks in to the hotel in the first embodiment. As illustrated in FIG. 4, a guidance screen G7 asking user to hold the check-in code of the first application over the reading unit 46 is displayed on the check-in terminal 40 arranged at the hotel. The user holds the code C60 over the reading unit 46 of the check-in terminal 40. When the code C60 is read by the reading unit 46, the check-in terminal 40 transmits the code ID included in the code C60 to the first server 10.

The first server 10 identifies the user ID associated with the code ID, and transmits the identified user ID to the second server 20. The second server 20 acquires the reservation contents associated with the user ID, and executes check-in based on the reservation contents. As illustrated in FIG. 4, a completion screen G8 including information such as a name and an address input by the user at the time of reservation is displayed on the check-in terminal 40. The check-in terminal 40 discharges a room key of the room reserved by the user. The user receives the room key, and moves to the room.

As described above, the check-in system S according to the first embodiment executes check-in to the hotel reserved from the second service by using the check-in code C60 displayed from the first application. The information required for check-in is centrally managed by the first application, and therefore the information required for check-in can be managed more easily. The details of this technology are now described.

[1-3. Functions Implemented by Check-In System of First Embodiment]

Figure 5:
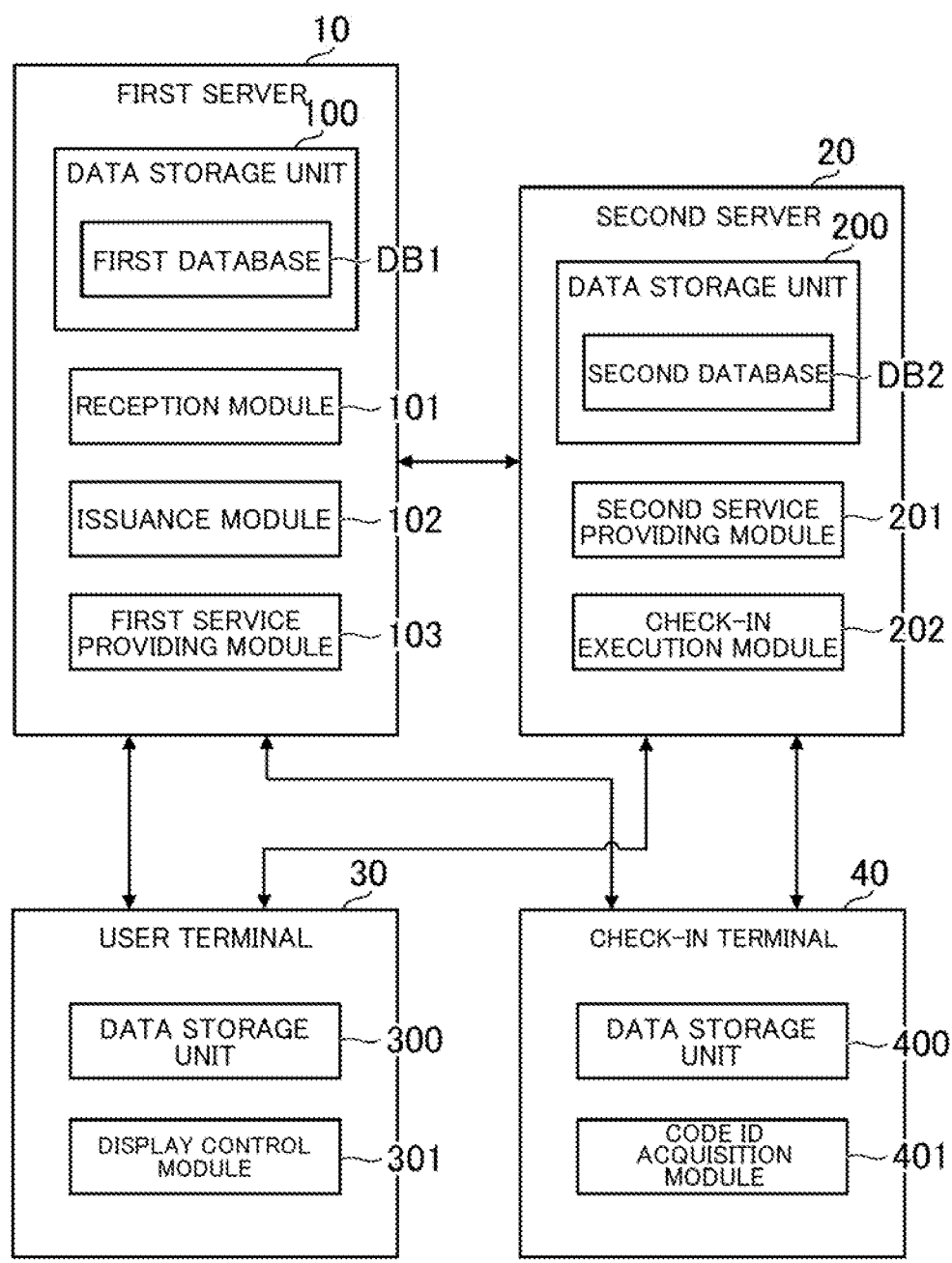
FIG. 5 is a functional block diagram for illustrating an example of functions implemented by the check-in system according to the first embodiment.

FIG. 5 is a functional block diagram for illustrating an example of functions implemented by the check-in system S of the first embodiment.

[1-3-1. Functions Implemented on First Server]

As illustrated in FIG. 5, on the first server 10, a data storage unit 100, a reception module 101, an issuance module 102, and a first service providing module 103 are implemented. The data storage unit 100 is implemented mainly by the storage unit 12. Each of the reception module 101, the issuance module 102, and the first service providing module 103 is implemented mainly by the control unit 11.

[Data Storage Unit]

The data storage unit 100 stores data required for providing the first service to the user and data required for the check-in of the user. For example, the data storage unit 100 stores a first database DB1.

FIG. 6 is a table for showing a data storage example of the first database DB1. As shown in FIG. 6, the first database DB1 is a database in which information relating to users who have set the use of the first service is stored. For example, the first database DB1 stores a user ID, a password, a code ID, an expiration time, a full name, and a usage status of the first service.

The user ID is an example of second information. Accordingly, the user ID as used herein can be read as "second information." The second information is not limited to the user ID, and may be any information that can identify the user in at least the second service. For example, the second information may be information called by another name such as "user account" instead of the information called "ID," or an email address may be used as the second information. In addition, for example, the second information may be a user ID independently issued by the second service instead of the user ID common to the first service.

The code ID is an example of first information. Accordingly, the code ID as used herein can be read as "first information." The first information is not limited to the code ID, and may be any information that can identify the user in at least the first service. For example, the first information may be information called by another name such as "user account" instead of the information called "ID," or an email address may be used as the first information.

For example, the user ID may correspond to the first information. When the user ID corresponds to the first information, the second information described later is not required to be present, and is not required to be used at the check-in. In addition, for example, the first information may be a user ID independently issued by the first service instead of the user ID common to the second service. In this case, it is required to identify the user on the second service side, and hence the second information may be present and may be used for the check-in. The association between the first information and the second information may be managed by a second database DB2 instead of the first database DB1.

In the first embodiment, a procedure for membership registration of a user is common to the first service and the second service. When the user registers as a member, a user ID being information that can identify the user in both the first service and the second service is issued. For example, registration information on the user associated with the user ID is stored in a database for management different from the first database DB1 and the second database DB2. The registration information includes, for example, a password, a full name, an address, and a telephone number. The registration information may include other personal information.

After the user has completed the membership registration procedure, the user performs a procedure for setting the use of the first service. When this procedure for setting the use has been completed, a record corresponding to the user is created in the first database DB1. This record stores the user ID, the password, and the full name that are stored in the database for management.

In the first embodiment, the first server 10 manages the code ID and the user ID in association with each other by using the first database DB1. The code ID and the user ID may be stored in an external database. That is, the first server 10 may manage the association between the code ID and the user ID by using an external database. The first server 10 transmits the user ID associated with the code ID acquired by a code ID acquisition module 401 described later to the second server 20. It suffices that contents corresponding to the first service are stored in the usage status of the first service. In the first embodiment, an SNS service corresponds to the first service, and therefore the usage status of the first service includes a group to which the user belongs, friends of the user, and talk contents of the user. First service information is updated when the user uses the first service. The information stored in the first database DB1 is not limited to the example of FIG. 6, and any information may be stored therein. For example, information for logging in to the first service without inputting a user ID and a password may be stored.

[Reception Module]

The reception module 101 receives from the user terminal 30 an issuance request to issue a code ID. The issuance request is made by transmitting data having a predetermined format. The issuance request can be transmitted at any time, for example, when the first application is started, when the user logs in to the first service, when the expiration time of the code ID is reached, or when issuance of a code ID is instructed by the user.

[Issuance Module]

The issuance module 102 issues, when an issuance request is received, a code ID and transmits the issued code ID to the user terminal 30. The issuance module 102 issues the code ID based on a predetermined ID issuance rule so that there is no duplication with other code IDs. The issuance module 102 may also randomly issue the code ID based on a random number. The issuance module 102 determines a time after a predetermined period from the current date and time as the expiration time of the code ID. The issuance module 102 stores the code ID and expiration time in the first database DB1 in association with the user ID of the user who has made the issuance request. In the first embodiment, a case in which the issuance module 102 also transmits the expiration time to the user terminal 30 is described, but the expiration time is not required to be transmitted to the user terminal 30.

[First Service Providing Module]

The first service providing module 103 provides the first service to the user. It suffices that the first service providing module 103 executes processing corresponding to the contents of the first service. In the first embodiment, an SNS service corresponds to the first service, and therefore, for example, the first service providing module 103 updates the first service information in the first database DB1 so that messages input by the user are transmitted to another user. For example, the first service providing module 103 updates the first service information in the first database DB1 so that when a certain user adds a friend by using the code C50, the friend of the user is added.

[3-2. Functions Implemented on Second Server]

As illustrated in FIG. 5, on the second server 20, a data storage unit 200, a second service providing module 201, and a check-in execution module 202 are implemented. The data storage unit 200 is implemented mainly by the storage unit 22. Each of the second service providing module 201 and the check-in execution module 202 is implemented mainly by the control unit 21.

[Data Storage Unit]

The data storage unit 200 stores data required for providing the second service to the user and data required for the check-in of the user. For example, the data storage unit 200 stores the second database DB2.

FIG. 7 is a table for showing a data storage example of the second database DB2. As shown in FIG. 7, the second database DB2 is a database in which information relating to users who have set the use of the second service is stored. For example, the second database DB2 stores a user ID, a password, a full name, application entry information, and check-in information.

After the user has completed the membership registration procedure, the user performs a procedure for setting the use of the second service. When this procedure for setting the use has been completed, a record corresponding to the user is created in the second database DB2. This record stores the user ID, the password, and the full name that are stored in the database for management.

The application entry information is information relating to contents of an application entry relating to the second service. In the first embodiment, reservation of a hotel corresponds to the application entry relating to the second service. Accordingly, the reservation of a hotel as used herein can be read as "application entry relating to the second service." The application entry relating to the second service is an application entry performed from the second service or an application entry for using the second service.

When a travel reservation service corresponds to the second service like in the first embodiment, reservation of a hotel is an application entry performed from the second service. The application entry for the second service is not limited to reservation of a hotel, and is only required to be an application entry corresponding to the second service. For example, a reservation of another facility, such as a tourist facility, a public facility, an amusement facility, a restaurant, or a beauty salon, may correspond to the application entry. Further, for example, a reservation of an airplane, a train, a rental car, and the like may correspond to the application entry. Moreover, for example, the purchase of a ticket in the second embodiment described later also corresponds to an application entry.

It suffices that the application entry information includes contents corresponding to the second service. In the first embodiment, reservation of a hotel corresponds to the application entry, and therefore the application entry information shows the reservation contents of the hotel. For example, the application entry information includes information that can identify the hotel (for example, hotel name and hotel ID), a check-in date, a check-out date, and the name, address, and telephone number of the guest. Check-in information is information on a check-in status. For example, the check-in information includes whether or not check-in has been performed and the date and time of execution of check-in.

In the first embodiment, the second server 20 manages the user ID and the application entry information in association with each other by using the second database DB2. The user ID and the application entry information may be stored in an external database. That is, the second server 20 may manage the association between the user ID and the application entry information by using an external database. The code ID may be shared with the second server 20 and the application entry information may be associated with the code ID. In this case, the application entry information can be retrieved from the code ID without using the user ID.

For example, when the user has made a reservation for each of a plurality of hotels, the second server 29 manages the user ID in association with pieces of application entry information of the plurality of hotels. That is, the application entry information is managed on a reservation-by-reservation basis. The information stored in the second database DB2 is not limited to the example of FIG. 7, and any information may be stored. For example, the code ID may be stored. Further, the data storage unit 200 may store data of the top page P1, for example, basic information on the hotel, and vacancy information.

[Second Service Providing Module]

The second service providing module 201 provides the second service to the user. It suffices that the second service providing module 201 executes processing corresponding to the contents of the second service. In the first embodiment, a travel reservation service corresponds to the second service, and hence the second service providing module 201 provides the user with, for example, a page (for example, top page P1) for receiving the reservation of a hotel. Further, for example, the second service providing module 201 searches hotels based on a search condition input by the user. Further, for example, when the user has reserved a hotel, the second service providing module 201 generates application entry information, and stores the application entry information in the second database DB2 in association with this user.

[Check-in Execution Module]

The check-in execution module 202 executes the check-in to the hotel based on the code ID or the user ID associated with the code ID. The second server 20 in the first embodiment does not manage the code ID by itself, and hence the check-in execution module 202 executes the check-in to the hotel based on the user ID associated with the code ID. When the second server 20 manages the code ID by itself, the check-in execution module 202 executes the check-in to the hotel based on the code ID. In this case, the user ID is not used for the check-in.

Executing the check-in refers to detecting that the user has visited the hotel. Identifying the user who has visited the hotel or identifying the hotel that has been visited by the user corresponds to executing the check-in. For example, updating the check-in information of the second database DB2 corresponds to executing the check-in. Further, for example, transmitting all or a part of the application entry information on the user to the check-in terminal 40 at the hotel visited by the user or another terminal at the hotel corresponds to executing the check-in.

In the first embodiment, the user has made the hotel reservation by using the second service before visiting the hotel. The check-in execution module 202 thus executes check-in based on the application entry information associated with the user ID. The user ID of the user subjected to the check-in may be identified by the second server 20 itself, but in the first embodiment, the check-in execution module 202 executes the check-in based on the application entry information associated with the user ID received from the first server 10.

For example, when the second database DB2 includes the application entry information associated with the user ID received from the first server 10, the check-in execution module 202 updates the check-in information associated with this user ID. The check-in execution module 202 updates this check-in information so as to indicate that the user has already checked in and to include the current date and time as the check-in date and time. Further, for example, the check-in execution module 202 transmits all or a part of the application entry information associated with this user ID to the check-in terminal 40 at the hotel visited by the user or another terminal at the hotel.

When the user has reserved a plurality of hotels, there are a plurality of pieces of application entry information, and therefore the check-in execution module 202 executes check-in based on, from among the pieces of application entry information of the plurality of hotels, the application entry information of the hotel visited by the user. The hotel visited by the user can be identified based on the terminal ID of the check-in terminal 40. The first server 10 receives the terminal ID together with the code ID from the check-in terminal 40. The first server 10 transmits the terminal ID to the second server 20 together with the user ID associated with the code ID.

The second server 20 receives the terminal ID and the user ID from the first server 10. The check-in execution module 202 identifies the hotel visited by the user based on the terminal ID. The check-in execution module 202 executes check-in to the hotel based on the application entry information of the identified hotel from among the pieces of plurality of application entry information. A relationship between the terminal ID and the hotel is assumed to be stored in advance in the data storage unit 200. That is, which check-in terminal 40 having the terminal ID is arranged in which hotel is stored in advance in the data storage unit 200. Instead of storing such a relationship in the data storage unit 200, information that can identify the hotel in which a certain check-in terminal 40 is arranged may be transmitted from the check-in terminal 40.

[1-3-3. Functions Implemented on User Terminal]

As illustrated in FIG. 5, on the user terminal 30, a data storage unit 300 and a display control module 301 are implemented. The data storage unit 300 is implemented mainly by the storage unit 32. The display control module 301 is implemented mainly by the control unit 31.

[Data Storage Unit]

The data storage unit 300 stores data required for the user to use each of the first service and the second service and data required for the check-in. For example, the data storage unit 300 stores the first application and the code ID. The user terminal 30 receives the code ID issued by the issuance module 102, and records the code ID in the data storage unit 300 of the user terminal 30 itself. When the user terminal 30 also receives the expiration time of the code ID, the user terminal 30 also records the expiration time in the data storage unit 300 of the user terminal 30 itself.

[Display Control Module]

The display control module 301 causes the display unit 35 to display the screens illustrated in each of FIG. 2 and FIG. 3. For example, the display control module 301 can display a code including the code ID based on the first application for using the first service. In the first embodiment, the display control module 301 can display each of the code C50 for the first service and the code C60 for the second service. In the first embodiment, a case in which the code C50 also includes the code ID is described, but the code C50 may include other information that can identify the user without including the code ID.

The code C50 is an example of a first code, and the code C60 is an example of a second code. Accordingly, the code C50 as used herein can be read as "first code," and the code C60 as used herein can be read as "second code." The first code and the second code may each be any code, and are not limited to the example in the first embodiment. The first code and the second code may each be a bar code instead of a two-dimensional code, or may be a code having an appearance which changes over time. The display control module 301 encodes the code IDs stored in the data storage unit 300 and displays each of the codes C50 and C60.

[1-3-4. Functions Implemented on Check-In Terminal]

As illustrated in FIG. 5, on the check-in terminal 40, a data storage unit 400 and the code ID acquisition module 401 are implemented. The data storage unit 400 is implemented mainly by the storage unit 42. The code ID acquisition module 401 is implemented mainly by the control unit 41.

[Data Storage Unit]

The data storage unit 400 stores data required for the check-in. For example, the data storage unit 400 stores a terminal ID that can identify the check-in terminal 40 and information that can identify the first server 10. In addition, for example, the data storage unit 400 may store information that can identify the hotel at which the check-in terminal 40 is arranged.

[Code ID Acquisition Module]

When the user of the first service visits the hotel, the code ID acquisition module 401 acquires the code ID of the user that can identify the user in the first service through use of at least one of the user terminal 30 of the user or the check-in terminal 40 at the hotel. In the first embodiment, a case in which both the user terminal 30 and the check-in terminal 40 are used is described, but as described later in the modification examples, only any one of the user terminal 30 or the check-in terminal 40 may be used.

In the first embodiment, the code ID is recorded in the data storage unit 300 of the user terminal 30, and hence the code ID acquisition module 401 acquires the code ID recorded in the user terminal 30. For example, in the first embodiment, the code ID acquisition module 401 acquires the code ID when the code C60 is read by the check-in terminal 40. It suffices that the check-in terminal 40 is a terminal for acquiring the code ID, and is a terminal that supports a method of acquiring the code ID.

The code ID is not required to be optically acquired, and may be acquired by communication. In this case, a communication device capable of communicating to/from the user terminal 30 may correspond to the check-in terminal. The communication itself can use any protocol, and may be, for example, Wi-Fi (trademark), Bluetooth (trademark), or infrared communication, or may be short-range wireless communication employed by a publicly known IC card.

The hotel is an example of a location relating to the second service. Accordingly, the hotel as used herein can be read as "location relating to the second service." The location relating to the second service is a location for which an application entry is performed through use of the second service or a location at which the second service is provided. For example, the location relating to the second service may be another facility, such as a tourist facility, a public facility, an airport, a train station, a store, a restaurant, or a beauty salon. Further, an outdoor space, a bus stop, or another such location with no particular facility may be the location relating to the second service.

[1-4. Processing to be Executed by Check-In System of First Embodiment]

FIG. 8 and FIG. 9 are flow charts for illustrating an example of processing to be executed by the check-in system S of the first embodiment. The processing illustrated in FIG. 8 and FIG. 9 is executed by the control units 11, 21, 31, and 41 operating in accordance with the programs stored in the storage units 12, 22, 32, and 42, respectively. The processing illustrated in FIG. FIG. 8 and FIG. 9 is an example of processing to be executed by the functional blocks illustrated in FIG. 5.

As illustrated in FIG. 8, hotel reservation processing is executed between the second server 20 and the user terminal 30 (Step S1). In Step S1, a hotel is reserved in accordance with the flow described with reference to FIG. 2. The second server 20 generates application entry information based on the information received from the user terminal 30, and stores the application entry information in the second database DB2 in association with the user ID of the user who has reserved the hotel.

When the user selects the first application from the operation unit 34, the user terminal 30 activates the first application stored in the storage unit 32 (Step S2), and executes login processing in cooperation with the first server 10 (Step S3). In Step S3, the user terminal 30 transmits an execution request for the login processing to the first server 10. This execution request includes information required for the login, and in the first embodiment, corresponds to an issuance request to issue a code ID. The first server 10 executes the login processing based on the information received from the user terminal 30 and the first database DB1.

The first server 10 issues a code ID and transmits the issued code ID to the user terminal 30 when the login is successful (Step S4). In Step S4, the first server 10 sets an expiration time for the issued code ID, and stores the expiration time in the first database DB1 in association with the user ID used in the successful login. The user terminal 30 receives the code ID, and records the code ID in the storage area of the first application of the storage unit 32 (Step S5). The expiration time of the code ID is also stored in the storage area.

The user terminal 30 displays the home screen G4 of the first application on the display unit 35 (Step S6). Then, processing corresponding to the operations by the user is executed. Here, a case in which an operation of selecting the button B41 is performed is described. When the expiration time of the code ID is reached, the code C50 is not displayed, and a new code ID is issued in the same way as the processing steps of Step S4 and Step S5.

When the user selects the button B41, the user terminal 30 displays the code C60 for the check-in on the display screen G6 based on the code ID recorded in the storage area for the first application (Step S7). When the user visits the hotel for which the reservation has been made, the user holds the code C60 displayed in Step S7 over the check-in terminal 40. The check-in terminal 40 acquires the code ID included in the code C60 based on a result of reading the code C60 by the reading unit 46 (Step S8).

Referring next to FIG. 9, the check-in terminal 40 transmits the terminal ID and the code ID to the first server 10 (Step S9). The first server 10 receives the terminal ID and the code ID, and then acquires the user ID associated with the code ID based on the first database DB1 (Step S10). The first server 10 transmits the terminal ID received from the check-in terminal 40 and the user ID acquired in Step S10 to the second server 20 (Step S11).

The second server 20 receives the terminal ID and the user ID, and then acquires the application entry information for the hotel corresponding to the terminal ID associated with the user ID based on the second database DB2 (Step S12). When the application entry information associated with the user ID is not present in the second database DB2, this process ends and check-in is not executed. Even in a case in which application entry information is present, when the application entry information is not for the hotel corresponding to the terminal ID, this process ends and check-in is not executed.

The second server 20 executes check-in to the hotel based on the application entry information acquired in Step S12 (Step S13). In Step S13, the second server 20 updates the check-in information associated with the user ID received from the first server 10. Further, the second server 20 transmits all or a part of the application entry information acquired in Step S12 to the check-in terminal 40 indicated by the terminal ID received from the first server 10. The check-in terminal 40 receives all or a part of the application entry information, displays the completion screen G8 on the display unit 46 based on the application entry information (Step S14), and this process ends.

According to the check-in system S of the first embodiment, when the user of the first service visits a hotel which has been reserved by using the second service, by using the code ID of the first service to execute check-in to the hotel, it is not required to separately manage the information required for check-in from the first application, and therefore management of the information required for check-in can be simplified. For example, it is conceivable that the code for the check-in of a hotel reserved by the user is transmitted by email and the user displays this code on the user terminal 30 to check in on the day of the stay. However, the user is required to find the code from a large number of email messages, and the management of the information becomes complicated. In this respect, the number of pieces of information to be managed can be reduced by allowing the user to check in from the first application used daily by the user.

Moreover, when the code C60 displayed from the first application has been read by the check-in terminal 40, the check-in system S can execute check-in by a simple operation of reading the code C60 by acquiring the code ID. In addition, the code C60 can be displayed from the first application and the code for checking-in to the hotel is not required to be managed separately from the first application. As a result, it is possible to simplify the management of the information required for check-in.

Further, the check-in system S can use, when the check-in code C60 has been read by the check-in terminal 40, the code C50 for the first service and the code C60 for the check-in in different ways from each other by acquiring the code ID. As long as the user operates the first application, the user can use the first service and execute check-in to the hotel, and therefore management of the information on the user can be simplified.

Moreover, the check-in system S can prevent the same code ID from being reused for a long period of time by, when the issuance request is received from the user terminal 30, issuing the code ID, transmitting the issued code ID to the user terminal 30, and acquiring the code ID recorded in the user terminal 30. As a result, impersonation by a malicious third party is prevented, and security at the time of check-in is increased. For example, even when a malicious third party somehow obtains a screenshot of the code C60, through changing of the code ID, check-in is not possible with that screenshot, and therefore security is increased. Further, for example, through random generation of the code ID, third parties are prevented from predicting the code ID, and hence security is increased. As another example, security is further increased by shortening the interval for updating the code ID.

Further, the check-in system S can save the user time and effort during check-in by executing check-in based on the application entry information of a hotel reserved by the user. For example, the user is not required to register at the front desk of the hotel on the day of the stay.

Further, the check-in system S reduces the risk of user ID leakage and increases security by including the code ID in the codes C50 and C60 instead of the user ID. For example, the user ID can be included in the codes C50 and C60, but the user ID may be leaked to a malicious third party, and unauthorized login may be performed. In this regard, as a result of not including the user ID in the codes C50 and C60, leakage of the user ID to a third party and unauthorized login can be prevented. Even when the code ID is leaked, such a situation can be fixed simply by updating the leaked code ID to another code ID, and even when some information is leaked to a third party, it is not required to change the user ID.

Further, even when the user has reserved a plurality of hotels, the check-in system S can execute check-in to an appropriate hotel by executing check-in based on the application entry information of the hotel visited by the user.

Moreover, through use of the same code C60 at check-in to a plurality of hotels, it is not required to manage the information required for check-in on a hotel-by-hotel basis, and the management of information can be further simplified.

2. Second Embodiment

The first service and the second service may be any combination of services, and are not limited to the example in the first embodiment. In the second embodiment, a case in which the first service is an electronic payment service and the second service is a ticket sales service is described. In the second embodiment, description of parts that are the same as those in the first embodiment is omitted.

The first service in the second embodiment is a service for providing electronic payment. For example, the first service is a service for providing electronic payment using the user terminal 30. In the second embodiment, a case in which electronic payment is executed by using the first application is described. Payment means that can be used from the first application may be payment means of any type, for example, credit card, debit card, electronic money, electronic cash, points, bank account, wallet, cryptocurrency, or a combination thereof.

The first service may provide electronic payment using the IC chip 37 of the user terminal 30. The first service may provide electronic payment using a physical card, such as an IC card or a magnetic card, without the use of the user terminal 30. The first service may provide electronic payment through use of the user himself or herself (that is, through use of biometric authentication) instead of an object owned by the user. Any payment means can be used for those kinds of electronic payment as well.

The second service in the second embodiment is a service for receiving a ticket purchase application entry for a location that is to be visited by the user. The location is a location relating to the second service. The second service is a service for selling tickets to, for example, sports matches, concerts, theatrical performances, other events, movie theaters, and museums. The tickets sold on the second service may be tickets handled in publicly known ticket agencies.

The second embodiment is described by taking a case in which a user purchases a ticket for a baseball game by using the second service. For this reason, the stadium in which the game is held is an example of the location relating to the second service. Accordingly, the stadium as used herein can be read as "location relating to the second service." The location may be any location indicated on the ticket, and may be the location such as a concert venue, a theater, another event venue, a movie theater, or a museum.

Figure 10:
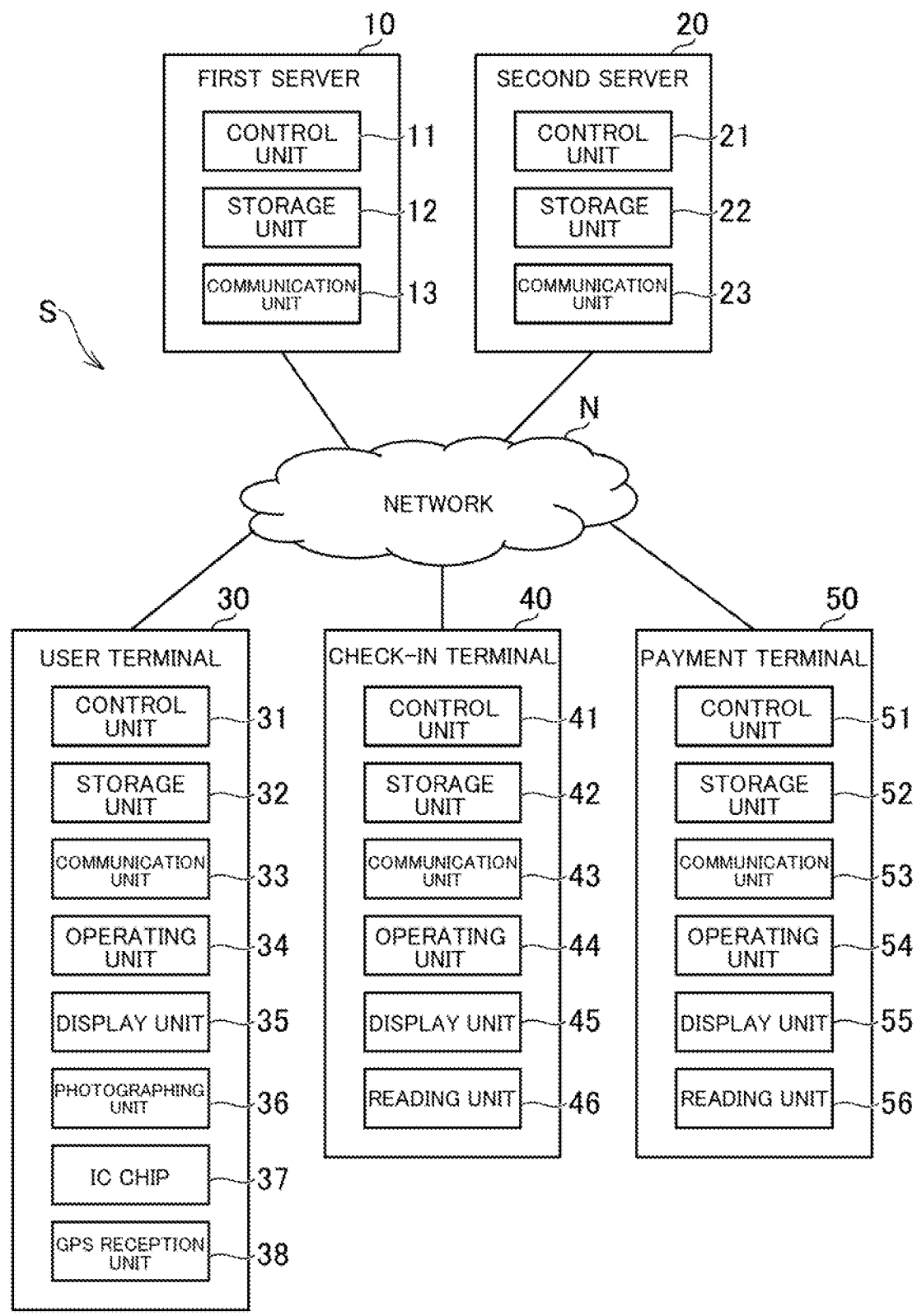
FIG. 10 is a diagram for illustrating an example of an overall configuration of a check-in system according to a second embodiment of the present disclosure.

FIG. 10 is a diagram for illustrating an example of an overall configuration of the check-in system S according to the second embodiment. As illustrated in FIG. 10, the check-in system S includes a payment terminal 50 in addition to the components described in the first embodiment. In the second embodiment, the check-in terminal 40 and the payment terminal 50 are arranged in the stadium. The payment terminal 50 is a computer of a shop in the stadium. In the second embodiment, a case in which the shop is in the stadium is described, but the shop may be outside the stadium as long as the shop is near the stadium.

For example, the payment terminal 50 is a POS terminal, a personal computer, a tablet terminal, or a smartphone. The payment terminal 50 includes a control unit 51, a storage unit 52, a communication unit 53, an operation unit 54, a display unit 55, and a reading unit 56. Physical configurations of the control unit 51, the storage unit 52, the communication unit 53, the operation unit 54, the display unit 55, and the reading unit 56 are the same as those of the control unit 11, the storage unit 12, the communication unit 13, the operation unit 34, the display unit 35, and the reading unit 46, respectively. In the second embodiment, the user first logs in to the second service and purchases a ticket of the game.

Figure 11:
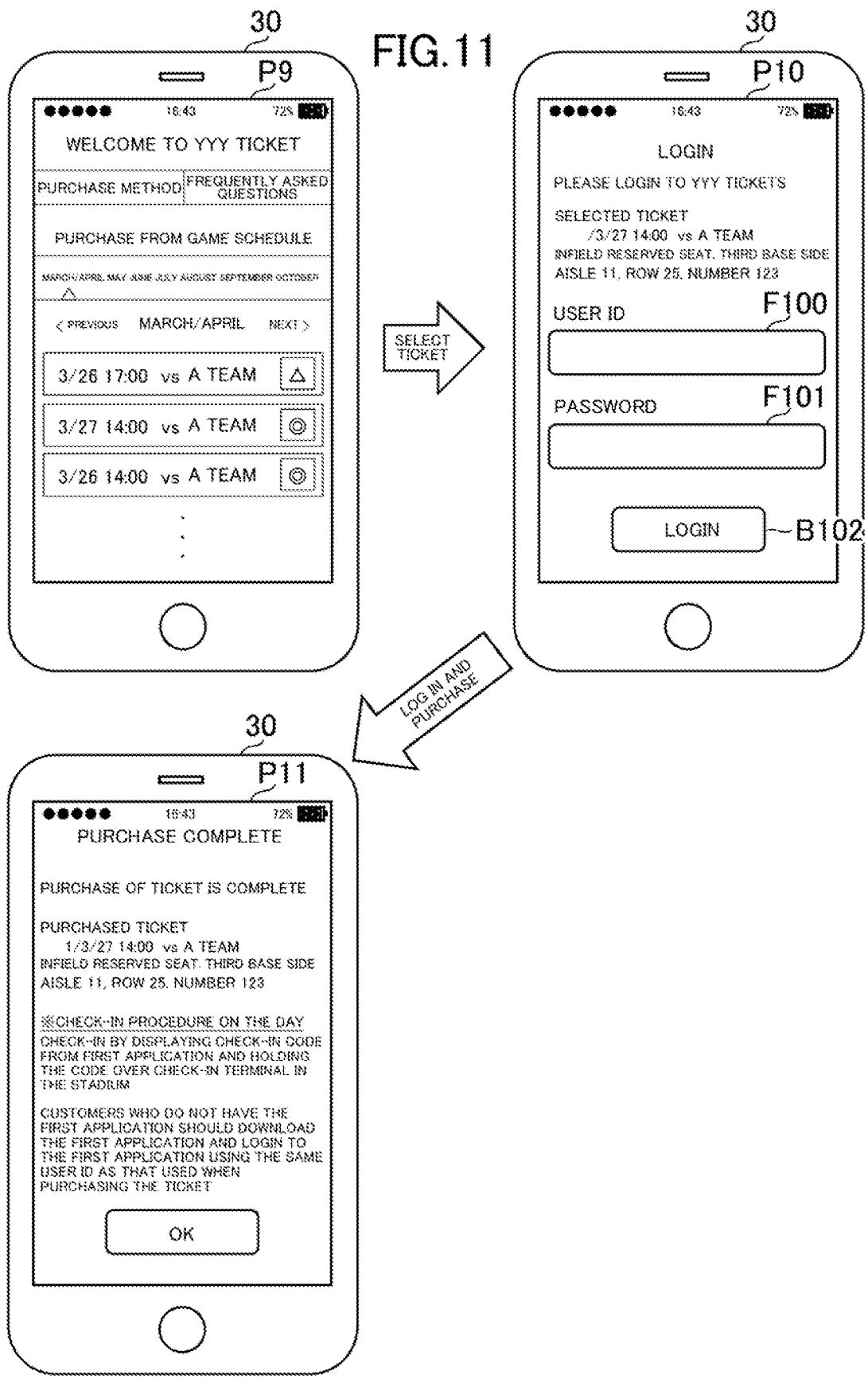
FIG. 11 is a diagram for illustrating an example of a procedure for purchasing a ticket from a second service in the second embodiment.

FIG. 11 is a diagram for illustrating an example of a procedure for purchasing the ticket from the second service in the second embodiment. As illustrated in FIG. 11, when the user accesses the second server 20 from the user terminal 30, a top page P9 of the second service is displayed. The user inputs any search condition on the top page P9 and searches for a desired ticket. When the user has performed the application entry for the desired ticket, a login page P10 of the second service is displayed.

The user logs in to the second service by inputting the user ID and the password in input forms F100 and F101, respectively, and selects the button B102, and then the purchase of the ticket is completed. The user may pay for the ticket by using the first service, or may pay for the ticket by using another payment means registered in the second service. On the user terminal 30, a purchase completion page P11 indicating that the purchase of the ticket is complete is displayed. As shown on the purchase completion page P11, the check-in method itself to the stadium is the same as that in the first embodiment. The user checks in to the stadium by using the first application.

Figure 12:
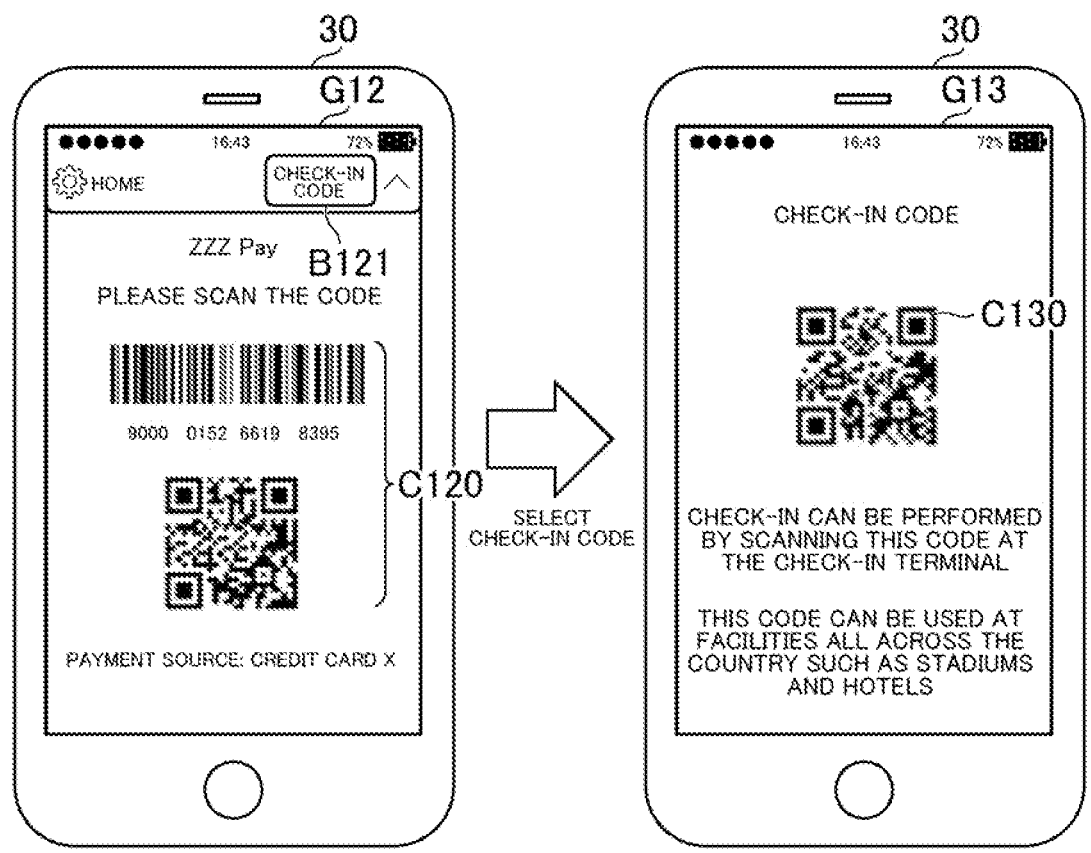
FIG. 12 is a diagram for illustrating an example of screens to be displayed from a first application in the second embodiment.

FIG. 12 is a diagram for illustrating an example of screens to be displayed from the first application in the second embodiment. When the user operates the user terminal 30 to start the first application, the code ID is issued in the same way as that in the first embodiment, and a home screen G12 of the first application is displayed. A code C120 for electronic payment is displayed on the home screen G12. The code C120 includes the code ID. The code C120 corresponds to the code C50 in the first embodiment. The method of displaying the code C120 is the same as the method of displaying the code C50.

The user can execute electronic payment through use of the code C120. For example, when the user checks in to the stadium and then causes the payment terminal 50 to read the code C120, the user can execute electronic payment based on payment means set in advance (credit card in FIG. 12).

The code C120 can be used for electronic payment at any shop other than those at the stadium. That is, the code C120 can be used at any location other than the location relating to the second service.

As a method itself of executing electronic payment, various methods can be used. For example, there can be used a method of reading a code displayed on the payment terminal 50 by the user terminal 30, a method of reading a code printed on paper or the like and posted in a shop by the user terminal 30, a method of holding the IC chip 37 of the user terminal 30 over a reader/writer of the payment terminal 50, or a method of completing the electronic payment only by an operation with respect to the user terminal 30.

When the user selects a button B121 on the home screen G12, a display screen G13 including a check-in code C130 is displayed on the display unit 35. The code C130 includes the code ID. The code C130 corresponds to the code C60 in the second embodiment. The method of displaying the code C130 is the same as the method of displaying the code C60 described in the first embodiment.

Figure 13:
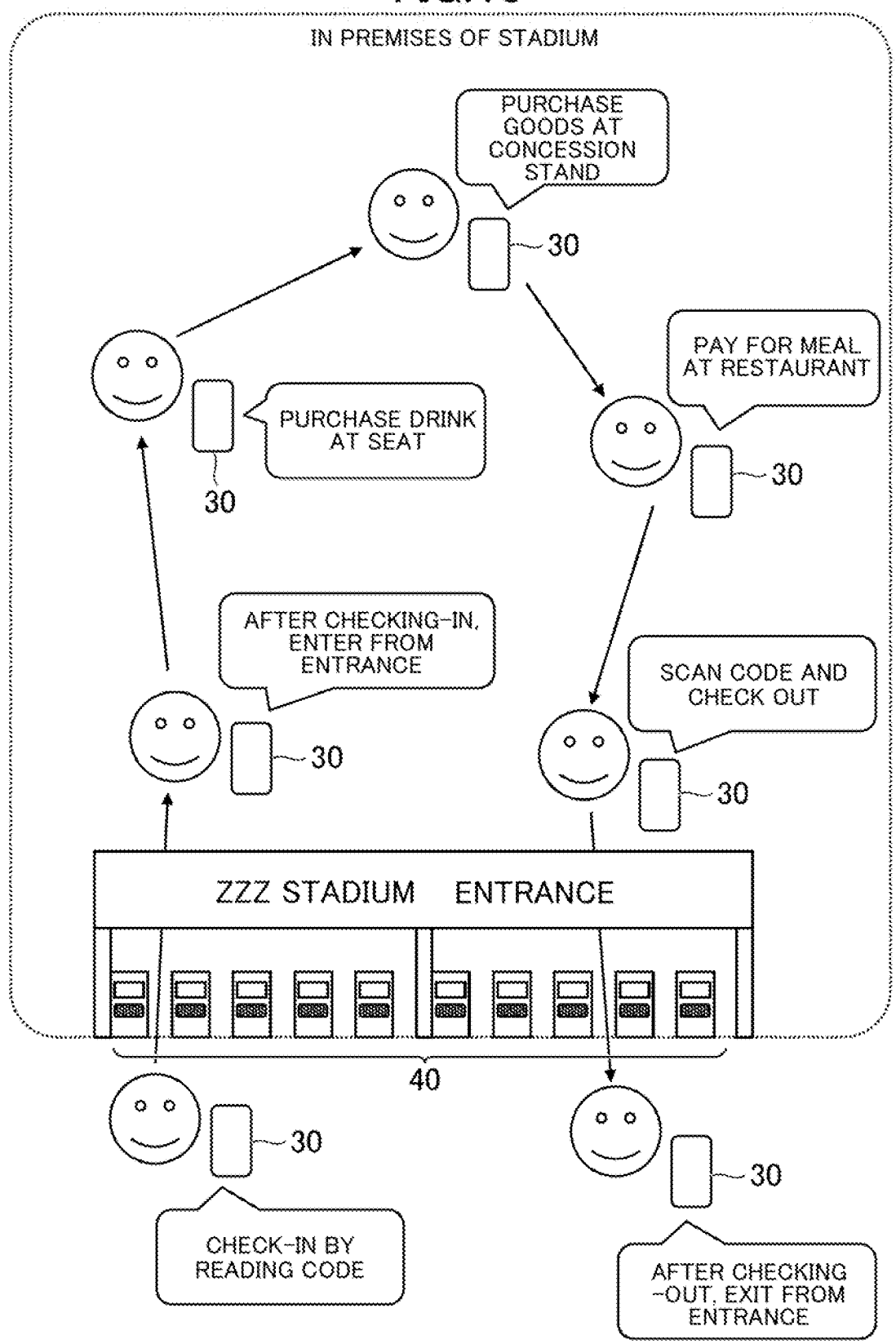
FIG. 13 is a diagram for illustrating an example of how a user visits a stadium and checks in to the stadium in the second embodiment.

FIG. 13 is a diagram for illustrating an example of how a user visits a stadium and checks in to the stadium in the second embodiment. As illustrated in FIG. 13, when the user holds the code C130 over the reading unit 46 of the check-in terminal 40 arranged at the entrance of the stadium, check-in is executed based on various controls by the first server 10 and the second server 20 in the same way as that in the first embodiment. When check-in is complete, the check-in terminal 40 displays the details of the ticket purchased by the user, and the user is permitted to enter. The check-in terminal 40 may issue the ticket purchased by the user from a printer connected to the check-in terminal 40.

When check-in is complete, the user enters from the stadium entrance. A payment terminal 50 is arranged at each of a plurality of positions in the stadium, and the user can purchase goods or use a service at any shop. When sellers moving in the stadium handle electronic payments, the sellers may carry a portable payment terminal 50. In the example of FIG. 13, the user purchases a drink at his or her seat, purchases goods at a concession stand, and pays for a meal at a restaurant by electronic payment using the first application.

When the game is over, the user holds the code C130 over the reading unit 46 of the check-in terminal 40 to check-out from the stadium. A flow at a time of the check-out is the same as a flow at a time of the check-in. When the second server 20 identifies a user who has checked out through the first server 10, the second server 20 executes processing for the check-out. The check-in terminal 40 displays a screen showing that check-out is complete. When check-out is complete, the user exits from the stadium entrance. Note that, check-out may be omitted.

The functional blocks and processing flow of the check-in system S of the second embodiment are the same as those in the first embodiment. In the second embodiment, the application entry information stored in the second database DB2 is information on the ticket purchased by the user. For example, the application entry information includes the date and time, start time, seat, and price of the game for which the user purchased the ticket. When check-in is executed, the information included in the application entry information is displayed on the check-in terminal 40.

In the second embodiment, it is assumed that the information required for electronic payment is stored in the first database DB1. For example, information on the payment means, such as credit card information, electronic money information, electronic cash information, or bank account information, is stored in the first database DB1 in association with the user ID. Further, for example, information identifying the payment means selected by the user from among a plurality of payment means is stored in the first database DB1 in association with the user ID.

When the user displays the code C120 on the user terminal 30 and holds the code C120 over the payment terminal 50, the payment terminal 50 reads the code C120, acquires the code ID, and transmits the acquired code ID to the first server 10 together with the information required for electronic payment (for example, payment amount). The first server 10 receives the code ID from the payment terminal 50. The first service providing module 103 refers to the first database DB1, and identifies the payment means selected by the user based on the information associated with the code ID. The first service providing module 103 executes the electronic payment based on the information (for example, credit card information) on the identified payment means. Various publicly known methods can be used for the method of executing electronic payment itself.

The first service providing module 103 may execute electronic payment relating to the ticket purchase. That is, the first service providing module 103 may be configured such that the user pays for, through the electronic payment of the first service, the ticket purchased by using the second service. Further, in a case in which the user can use a predetermined service in the stadium (in the example of FIG. 13, each of the services of drink purchase, goods purchase, and meal use), the first service providing module 103 may execute the electronic payment relating to use in the stadium when check-in is executed.

The check-in terminal 40 may have an electronic payment function. In this case, the code C120 includes information that can identify that the first service is to be used to execute electronic payment. When the check-in terminal 40 has read the code C120, the check-in terminal 40 transmits the information to the first server 10 together with the code ID. The first server 10 determines, based on the information, that processing is to be performed by the first service providing module 103. The first service providing module 103 may execute the electronic payment based on the same flow as described above.

Similarly, the code C130 may include information that can identify that check-in is to be executed. When the check-in terminal 40 has read the code C130, the information is transmitted to the first server 10 together with the code ID. The first server 10 may determine, based on the information, that the processing for check-in is to be executed. The first server 10 may perform the processing for check-in based on the same flow as described above.

Further, the payment terminal 50 may have a check-in function. In this case, as described above, the first server 10 may determine, based on the information included in the codes C120 and C130, whether processing is to be performed by the first service providing module 103 or whether processing for check-in is to be executed. Further, instead of including the information in the codes C120 and C130, the user may be allowed to select whether to use the first service or whether to execute check-in to the stadium, like in Modification Example 1 of the present disclosure described later.

According to the check-in system S of the second embodiment, the code C130 of check-in to the stadium can also be managed by the first application of the first service, which is an electronic payment service that is used relatively frequently by users, and therefore it becomes further easier to manage the information required for check-in. In addition, user convenience is also enhanced by paying for the ticket reserved by the user through the electronic payment of the first service. Further, through execution of electronic payments relating to use in the stadium when check-in is executed, the check-in system S simplifies payment in the stadium, and the user convenience is enhanced. Users can more easily manage the amount of payments used in the stadium.

3. Modification Examples

The present disclosure is not limited to the embodiments described above, and can be modified suitably without departing from the spirit of the present disclosure.

Figure 14:
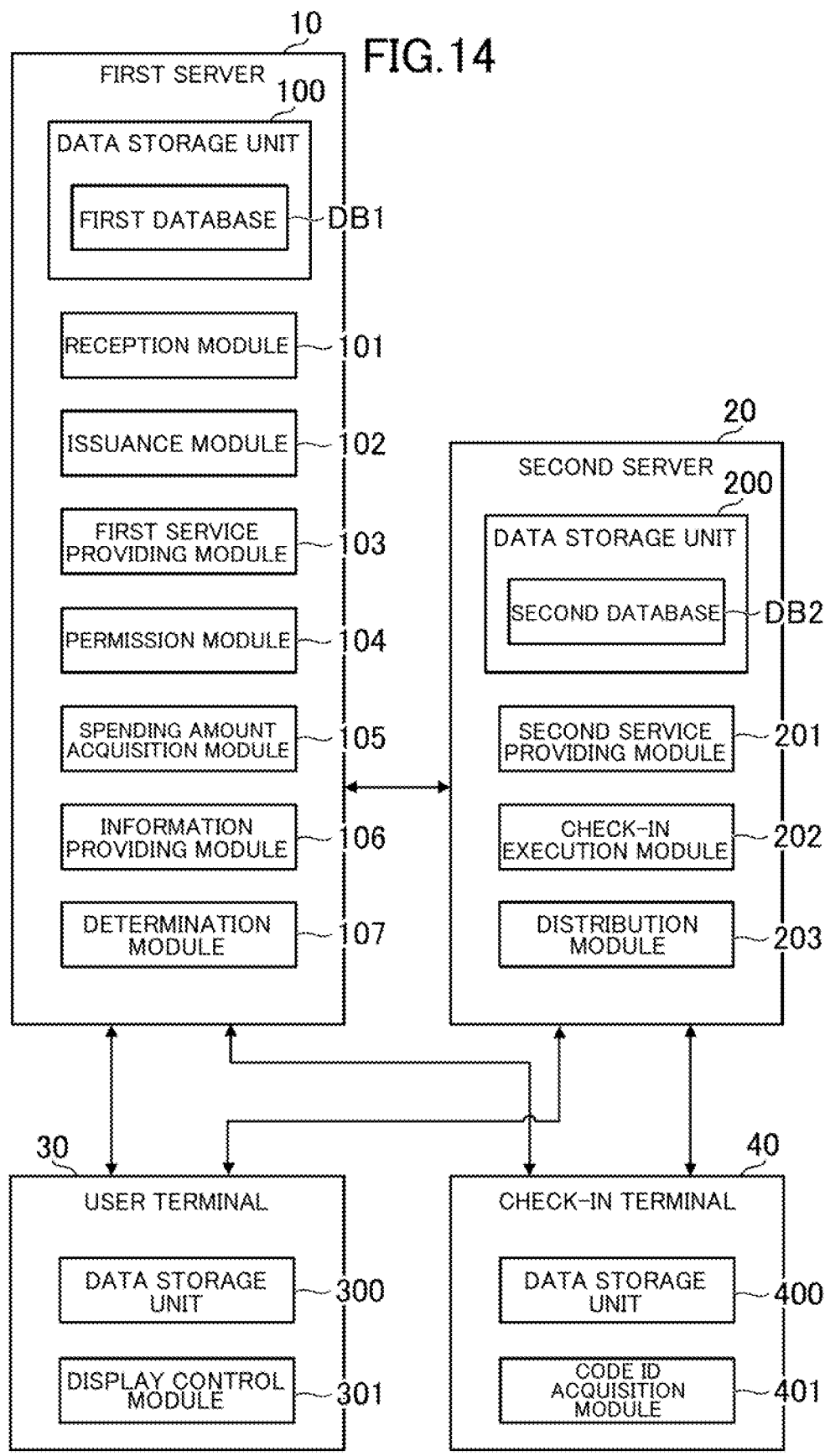
FIG. 14 is an example of a functional block diagram in modification examples of the present disclosure.

FIG. 14 is an example of a functional block diagram in the modification examples. In the modification examples described below, each of functions illustrated in FIG. 14 is implemented. Each of a permission module 104, a spending amount acquisition module 105, an information providing module 106, and a determination module 107 is implemented mainly by the control unit 11. A distribution module 203 is implemented mainly by the control unit 21. Combinations of the first service and the second service described in the second embodiment are described as examples, but the combinations described in the first embodiment may also be adopted.

3-1. Modification Example 1

Figure 15:
FIG. 15 is a diagram for illustrating an example of a home screen of a first application in Modification Example 1 of the present disclosure.

FIG. 15 is a diagram for illustrating an example of a home screen G14 of a first application in Modification Example 1. As illustrated in FIG. 15, the user terminal 30 may display a code C140 common to the first service and the second service. That is, the code for the first service and the check-in code may be the same. This common code includes the code ID. The method of issuing the code ID is the same as that in the first embodiment and the second embodiment.

For example, when the code C140 is read at a location (for example, a shop or a seller in a stadium) at which the first service can be used, the user can use the first service. The first service providing module 103 in Modification Example 1 provides the first service based on the code ID when the common code C140 has been read by the payment terminal 50 of the first service.

The payment terminal 50 is an example of a first service terminal. Accordingly, the payment terminal 50 as used herein can be read as "first service terminal." It suffices that the first service terminal is a computer for providing the first service, and is not limited to a payment terminal 50 arranged in the stadium. A computer arranged at a location unrelated to the stadium may correspond to the first service terminal. For example, a convenience store, a supermarket, another shop, a vending machine, or the like may correspond to the first service terminal.

In Modification Example 1, the data storage unit 100 of the first server 10 stores a terminal ID that can identify the first service terminal. When the first service terminal reads the common code C140 and acquires the code ID, the first service terminal transmits an own terminal ID and the code ID to the first server 10. The first service providing module 103 receives the terminal ID and the code ID, and determines whether or not the computer that has transmitted the terminal ID and the code ID is the first service terminal based on the terminal ID.

The first service providing module 103 executes, when it is determined that the computer that has transmitted the terminal ID and the code ID is the first service terminal, electronic payment based on the payment means specified by the user having the user ID associated with the code ID. As described in the second embodiment, a publicly known method can be used for the method of executing electronic payment itself. When the code C140 is read by the payment terminal 50 of the stadium, the first service providing module 103 executes the electronic payment based on the flow described above.

Meanwhile, when the code C140 is read by the check-in terminal 40 of the stadium, electronic payment is not executed, and the user can enter the stadium by using a ticket reserved through the second service. The code ID acquisition module 401 in Modification Example 1 acquires the code ID when the common code C140 is read by the check-in terminal 40. The check-in terminal 40 transmits the own terminal ID and the code ID to the first server 10 in the same way as that in the first embodiment and the second embodiment. The first server 10 identifies that the computer that has transmitted the terminal ID and the code ID is the check-in terminal 40 based on the terminal ID. Thereafter, check-in is executed based on the same flow as that in the first embodiment and the second embodiment.

When the check-in terminal 40 has an electronic payment function, the user may choose to use the first service or to execute check-in to the stadium. The check-in terminal 40 transmits the own terminal ID and the code ID to the first server 10 together with information that can identify a selection result of the user. The first server 10 may determine, based on this information, whether to cause the first service providing module 103 to perform processing or whether to execute processing for check-in. Similarly, when the payment terminal 50 has a check-in function, the first server 10 may determine whether to cause the first service providing module 103 to perform processing or whether to execute processing for check-in based on information that can identify the selection result of the user.

Further, as illustrated in FIG. 15, when the user selects a button B141, the contents of the purchased ticket may be displayed on the user terminal 30. In this case, the user terminal 30 requests the contents of the purchased ticket from the second server 20 via the first server 10. The second server 20 transmits all or a part of the application entry information stored in the second database DB2 to the user terminal 30 via the first server 10 or directly. The user can execute check-in by using the code C140 while checking the application entry information.

According to Modification Example 1, when the code C140 common to the first service and the second service is read by the check-in terminal 40, the code ID is acquired. Thus, the same code can be used as the code C140 of the first service and the second service, and information management can be simplified.

3-2. Modification Example 2

Figure 16:
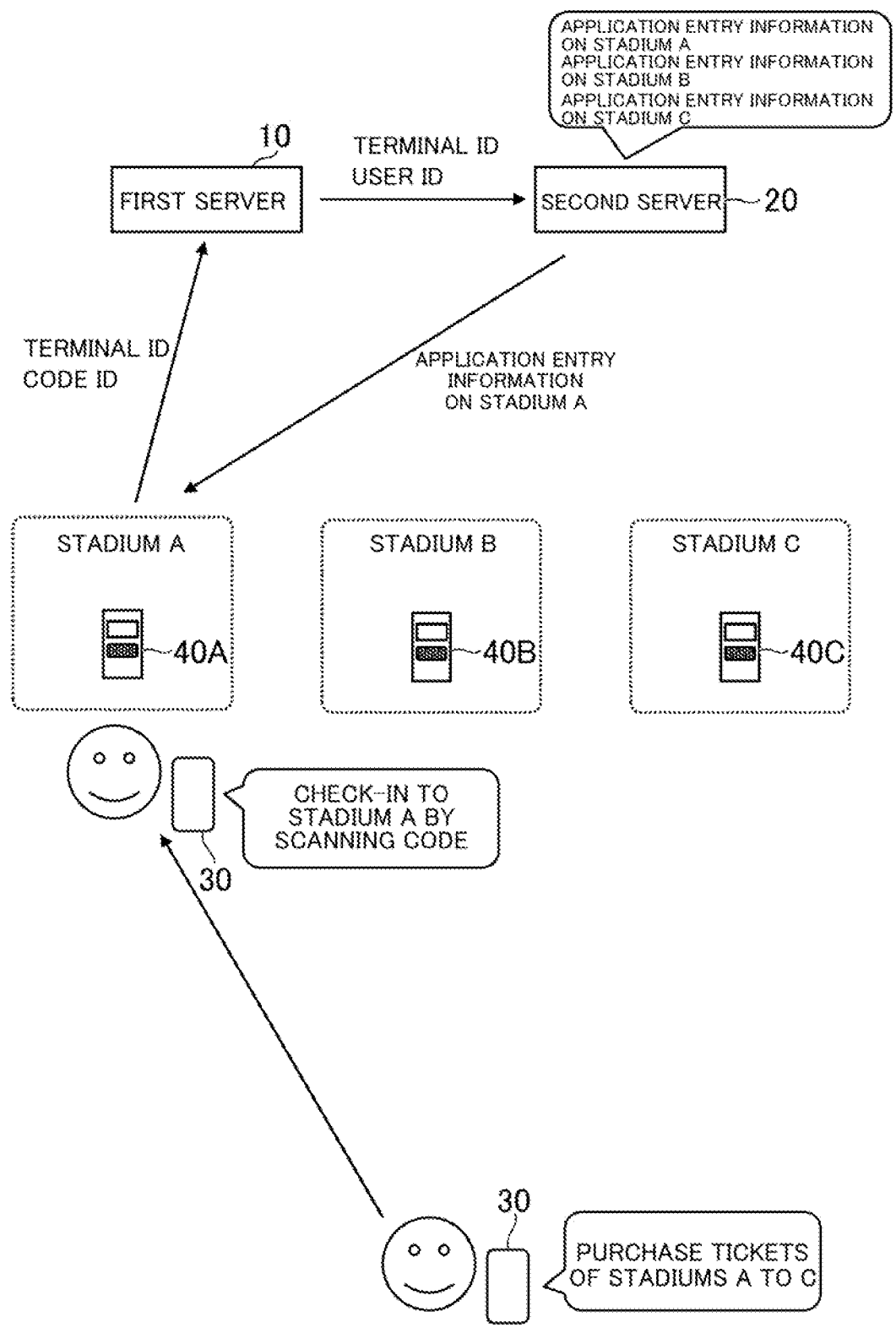
FIG. 16 is a diagram for illustrating an example of a check-in system according to Modification Example 2 of the present disclosure.

FIG. 16 is a diagram for illustrating an example of a check-in system S according to Modification Example 2 of the present disclosure. As illustrated in FIG. 16, in Modification Example 2, a case in which the user purchases a ticket of each of a plurality of stadiums A to C, and the user can visit each of the plurality of stadiums A to C is described. In the second database DB2 of the second server 20, the application entry information of each of the plurality of stadiums A to C is stored. In FIG. 16, a check-in terminal 40A is arranged in the stadium A, a check-in terminal 40B is arranged in the stadium B, and a check-in terminal 40C is arranged in the stadium C.

In the related art, a separate code is required in order to check in to each of the plurality of stadiums A to C, and hence code management is complex. To deal with the problem, the user terminal 30 in Modification Example 2 can display a code C140 common to the plurality of stadiums A to C. The user can check-in to each of the stadiums A to C by using the code C140. The code C140 is assumed to be common for the first service and for check-in like in Modification Example 1, but the check-in codes C60 and C130 may be used like in the first embodiment or the second embodiment.

The second server 20 stores, in the data storage unit 200, the terminal ID of each of the plurality of check-in terminals 40A to 40C in association with a stadium ID that can identify the stadium. As a result, by acquiring the terminal ID, the second server 20 can identify which stadium the user is attempting to check-in to. The stadium ID is included in the application entry information of the second server 20. The second server 20 can identify which stadium the user is attempting to check in to by acquiring the stadium ID associated with the terminal ID. The stadium ID is stored in each of the check-in terminals 40A to 40C, and may be transmitted from each of the check-in terminals 40A to 40C to the first server 10. In Modification Example 2, a case in which the user checks in to the stadium A is taken as an example. The code ID acquisition module 401 of the check-in terminal 40A acquires the code ID when the common code C140 is read by the check-in terminal 40A. The check-in terminal 40A transmits the own terminal ID and the code ID to the first server 10. The first server 10 refers to the first database DB1, and acquires the user ID associated with the code ID. The first server 10 transmits the terminal ID and the user ID to the second server 20.

The second server 20 receives the terminal ID and the code ID from the first server 10. The check-in execution module 202 acquires the stadium ID associated with the terminal ID, and acquires the user ID associated with the code ID. The check-in extension module 202 acquires the application entry information including the stadium ID from among the pieces of application entry information associated with the user ID.

In this case, the application entry information of the stadium A is acquired, and therefore the check-in execution module 202 executes check-in to the stadium A based on the application entry information. The check-in itself is as described in the second embodiment. A screen showing that check-in is complete is displayed on the check-in terminal 40A of the stadium A, and the user passes through the entrance of the stadium A.

Also in cases in which the user is to check-in to the stadium B or the stadium C, the check-in to the stadium B or the stadium C is executed by the same processing as described above. It suffices that the second server 20 identifies which of the stadium B or the stadium C the user is attempting to check-in to, based on the terminal ID received from the check-in terminal 40B or the check-in terminal 40C. The same is true in cases in which the number of stadiums for which the user has purchased tickets is two or four or more.

Further, the stadium to which the user is attempting to check-in may be identified by the first server 10. In this case, the first server 10 is assumed to store the terminal ID and the stadium ID in association with each other in the data storage unit 100. The first server 10 acquires a stadium ID associated with the terminal ID received from the check-in terminal 40, and transmits the acquired stadium ID to the second server 20 together with the user ID. The second server 20 receives the stadium ID and the user ID from the first server 10, and the subsequent processing to be executed by the check-in execution module 202 may be the same as described above.

According to Modification Example 2, when the code C140 common to the plurality of stadiums is read by the check-in terminal 40, the code ID is acquired. Thus, the same code can be used as the code C140 of the plurality of stadiums, and information management can be simplified.

3-3. Modification Example 3

Figure 17:
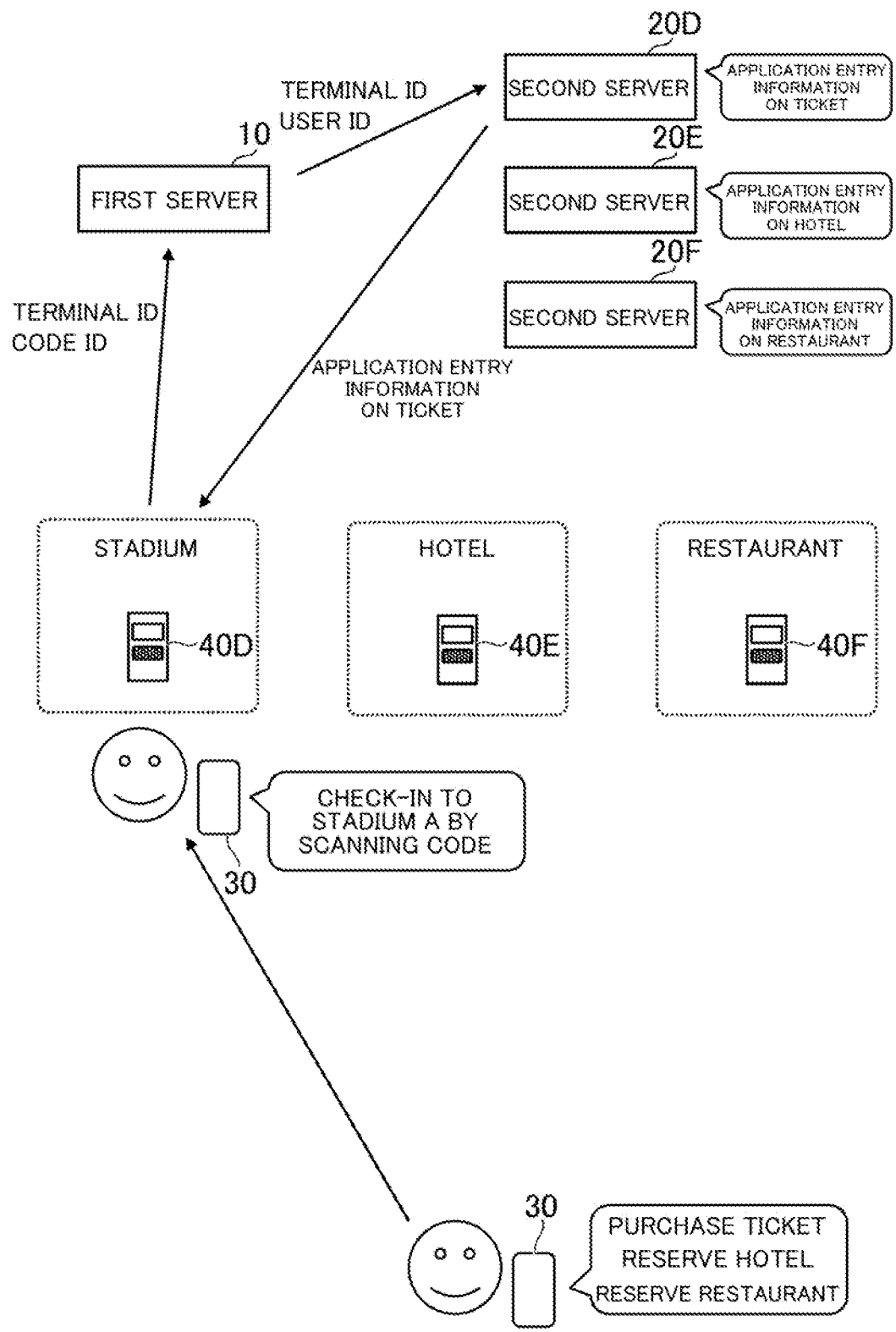
FIG. 17 is a diagram for illustrating an example of a check-in system according to Modification Example 3 of the present disclosure.

FIG. 17 is a diagram for illustrating an example of the check-in system S according to Modification Example 3 of the present disclosure. As illustrated in FIG. 17, in Modification Example 3, the user can use a plurality of second services and can visit the location relating to each of the plurality of second services. In Modification Example 3, a ticket purchase service, a travel reservation service, and a restaurant reservation service are described as examples of the plurality of second services. The check-in system S includes a second server 20D of the ticket purchase service, a second server 20E of the travel reservation service, and a second server 20F of the restaurant reservation service.

For example, a user has purchased a ticket for a match to be held in a stadium from the ticket purchase service. The second server 20D stores the application entry information of the ticket. The check-in terminal 40D is arranged in the stadium. The details of the ticket purchase service are as described in the second embodiment.

Further, for example, a user has reserved a hotel from the travel reservation service. The second server 20E stores the application entry information of the hotel. The check-in terminal 40E is arranged in the hotel. The details of the travel reservation service are as described in the first embodiment.

Further, for example, a user has reserved a restaurant from the restaurant reservation service. The second server 20F stores the application entry information of the restaurant. Various publicly known methods can be used for the restaurant reservation itself, and the format of the application entry information may be the same as in the first embodiment and the second embodiment. The application entry information includes contents such as information that can identify the restaurant, the date and time of the reservation, the name of the person who made the reservation, and the number of people. A check-in terminal 40F is arranged in the restaurant.

In the related art, a separate code is required in order to check-in to each of the stadium, the hotel, and the restaurant, and hence code management is complex. To deal with the problem, the user terminal 30 in Modification Example 3 can display a code C140 common to the plurality of second services. The user can check in to each of the stadium, the hotel, and the restaurant by using this code C140. The code C140 is assumed to be common for the first service and for check-in like in Modification Example 1, but the check-in codes C60 and C130 may be used like in the first embodiment or the second embodiment.

The first server 10 stores the terminal ID of each of the plurality of check-in terminals 40D to 40F in association with information that can identify each of the plurality of second servers 20D to 20F in the data storage unit 100. For this reason, the first server 10 can identify which location of the second service the user is attempting to check-in to by acquiring the terminal ID.

In Modification Example 3, a case in which the user checks in to the stadium is taken as an example. The code ID acquisition module 401 of the check-in terminal 40D acquires the code ID when the common code C140 is read by the check-in terminal 40D. The check-in terminal 40D transmits the own terminal ID and the code ID to the first server 10. The first server 10 identifies the second server 20D associated with the terminal ID. The first server 10 refers to the first database DB1, and acquires the user ID associated with the code ID. The first server 10 transmits the terminal ID and the user ID to the identified second server 20D.

The second server 20D receives the terminal ID and the code ID from the first server 10, and the subsequent processing to be executed by the check-in execution module 202 may be the same as in the second embodiment. Also when the user checks in to a hotel or a restaurant, the check-in to the hotel or the restaurant is executed by the same processing as described above. The first server 10 identifies, based on the terminal ID received from the check-in terminal 40E or the check-in terminal 40F, the second server 20E or the second server 20F associated with the terminal ID. It suffices that the first server 10 transmits the terminal ID and the user ID associated with the code ID to the identified second server 20E or the second server 20F. It suffices that the subsequent to be executed by the check-in execution module 202 is the same as described above.

According to Modification Example 3, when the code C140 common to the plurality of second services is read by the check-in terminal 40, the code ID is acquired. Thus, the same code can be used as the code C140 of the plurality of second services, and information management can be simplified.

3-4. Modification Example 4

Figure 18:
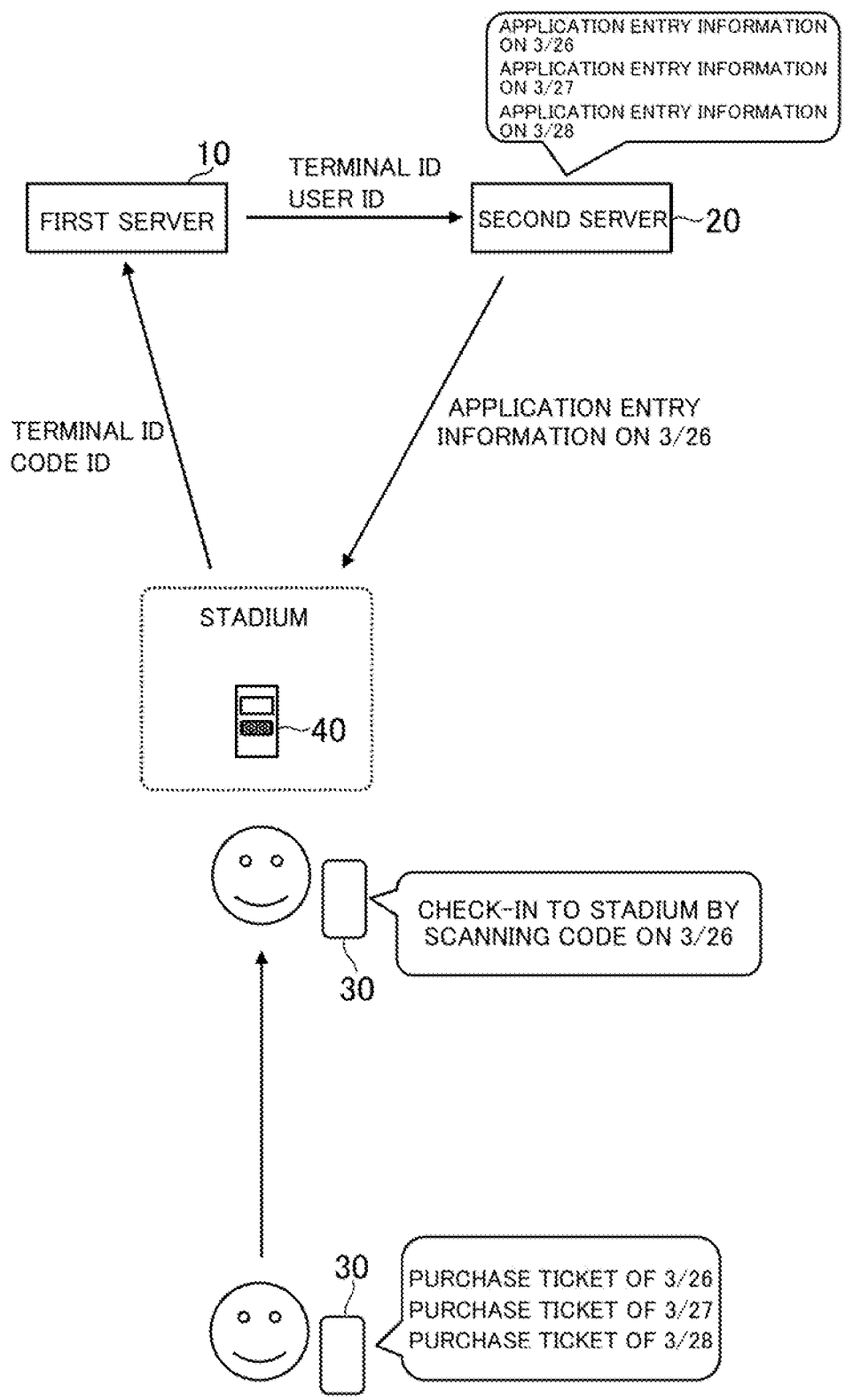
FIG. 18 is a diagram for illustrating an example of a check-in system according to Modification Example 4 of the present disclosure.

FIG. 18 is a diagram for illustrating an example of the check-in system S according to Modification Example 4 of the present disclosure. As illustrated in FIG. 18, in Modification Example 4, the user has purchased a ticket for each of a plurality of dates and times, that is, has purchased a ticket for March 26, a ticket for March 27, and a ticket for March 28. The procedure for purchasing each of the tickets is as described in the second embodiment. In FIG. 18, it is not required to distinguish among the check-in terminals 40, and hence, unlike in FIG. 16 and FIG. 17, the alphabet letter following the reference numeral "40" is omitted.

The second server 20 manages the user ID in association with the application entry information of each of the plurality of dates and times. That is, in the second database DB2, the application entry information of the ticket for March 26, the application entry information of the ticket for March 27, and the application entry information of the ticket for March 28 are stored in the record of the user who purchased the tickets.

In Modification Example 4, a case in which the user checks in to a stadium on March 26 is taken as an example. The flow until the terminal ID and the user ID are transmitted to the second server 20 is the same as in the second embodiment. When the second server 20 receives the terminal ID and the user ID from the first server 10, the second server 20 acquires the current date and time by using a real-time clock, for example. The check-in execution module 202 executes check-in based on, from among the pieces of application entry information of the plurality of dates and times, the application entry information of the date and time when the user visits the stadium (that is, current date and time).

The check-in execution module 202 acquires, from among the plurality of pieces of application entry information associated with the user ID received from the first server 10, the application entry information corresponding to the current date and time. The application entry information corresponding to the current date and time is application entry information in which the current date and time and the date and time of the application entry information match, application entry information in which the current date and the date of the application entry information match, or application entry information in which a difference between the current date and time and the date and time of the application entry information is less than a threshold value. The check-in execution module 202 executes check-in based on the acquired application entry information. In the example of FIG. 18, the check-in execution module 202 executes the check-in of March 26 based on the application entry information of March 26. The check-in execution method itself is as described in the second embodiment.

When the user checks into the stadium on March 27 or March 28 as well, the check-in of March 27 or March 28 is executed based on the application entry information of March 27 or the application entry information of March 28 by performing the same processing as described above. Further, the current date and time may be acquired by the first server 10 or the check-in terminal 40, and transmitted to the second server 20.

According to Modification Example 4, by executing check-in based on the application entry information of the date and time when the user visits the stadium from among the pieces of application entry information of the plurality of the dates and times for which the user has purchased a ticket, the same code can be used as the code C140 of a plurality of dates and times, and information management can be simplified.

3-5. Modification Example 5

For example, in the second embodiment, the user may perform an application entry for a plurality of tickets by using the second service. In Modification Example 5 of the present disclosure, the user who has performed the application entry for the tickets is described as "first user UA," and the users to which the tickets are to be distributed are described as "second users UB and UC." The first user UA performs an application entry and purchases three tickets for a match to be watched together with the second users UB and UC. The first user UA distributes ticket to each of the second users UB and UC. In addition, it is assumed that each of the first user UA and the second users UB and UC has finished setting up both the first service and the second service.

FIG. 19 is a diagram for illustrating an example of the check-in system S according to Modification Example 5. The second server 20 manages the user ID of the first user UA in association with the application entry information for each of the plurality of tickets. In FIG. 19, of the second database DB2, only a portion corresponding to the user ID and the application entry information is shown. Further, the content of the application entry information is simplified as "Ticket 1," for example. As illustrated in FIG. 19, at the point at which the user A has purchased three tickets, the application entry information for each of the three tickets is associated with the user ID "Yamada. Taro" of the first user UA. This state is the state before the distribution of the tickets.

The check-in system S of Modification Example 5 includes the distribution module 203. The first user UA performs an operation for distributing two of the three tickets, that is, one ticket to each of the second users UB and UC, from a user terminal 20A of the first user UA. The operation itself may be a method used by publicly known ticket agencies. For example, when the first user UA logs in to the second service, the three purchased tickets are displayed on the user terminal 20A. The first user UA specifies the user IDs of the second users UB and UC, and the tickets to be distributed. The second users UB and UC may each be identified based on other information such as an electronic mail address, instead of a user ID.

When the first user UA finishes the operation for distribution, the distribution module 203 distributes the tickets to the second users UB and UC by associating the pieces of application entry information for, of the plurality of tickets, the tickets of the second users UB and UC with the user IDs of the second users UB and UC. As illustrated in FIG. 19, the distribution module 203 associates two of the three pieces of application entry information associated with the user ID "Yamada. Taro" of the first user UA with the user IDs "hanako999" and "yoshida111jiro" of the second users UB and UC. As a result, the second and third tickets are distributed to the second users UB and UC, respectively. A notification to the effect that the distribution of tickets has been completed is transmitted to user terminals 20B and 20C of the second users UB and UC by electronic mail, for example.

The code ID acquisition module 401 acquires the code ID of the first user UA when the first user UA visits the stadium, and acquires the code ID of each of the second users UB and UC when the second users UB and UC visit the stadium. The method of acquiring the code ID itself may be the same as in the first embodiment and the second embodiment. The first server 10 refers to the first database DB1, acquires the user ID associated with the code ID of the first user UA, and acquires the user ID associated with the code ID of each of the second users UB and UC. The first server 10 transmits those user IDs to the second server 20.

The check-in execution module 202 performs the check-in of the first user UA based on the application entry information associated with the user ID of the first user UA. In the example of FIG. 19, the check-in execution module 202 performs check-in of the first user UA based on the application entry information of the first ticket associated with the user ID "Yamada. Taro". The pieces of application entry information for the tickets of the second users UB and UC are not referred to during the check-in of the first user UA.

The check-in execution module 202 performs the check-in of the second users UB and UC based on the pieces of application entry information associated with the user IDs of the second users UB and UC. In the example of FIG. 19, the check-in execution module 202 performs check-in of the second users UB and UC based on the pieces of application entry information of the second and third tickets associated with the user IDs "hanako999" and "yoshida111jiro". The application entry information for the ticket of the first user UA are not referred to during the check-in of the second users UB and UC. The check-in method itself is as described in the first embodiment and the second embodiment.

According to Modification Example 5, even when the first user UA distributes the tickets to the second users UB and UC, the second users UB and UC can each check-in to the stadium by displaying the code C140 on user terminals 30B and 30C of the second users UB and UC, and therefore the user convenience can be enhanced while simplifying the management of the information on each user. For example, even when the first user UA and the second users UB and UC visit the stadium separately, each user can check-in and enter the stadium from the own first application.

3-6. Modification Example 6

For example, in the case in which the first service is a service that provides electronic payment using the user terminal 30, the user is required to take out the user terminal 30 when he or she attempts to execute the electronic payment. In view of this, it is investigated to execute electronic payment through use of biometric authentication in order to save trouble of taking out the user terminal 30. For example, when the authentication at the time of electronic payment is completed only by face authentication of the user, the user is not required to take out the user terminal 30.

However, some users of the first service may include a certain user having a face similar to that of another user. In this case, when a certain user attempts to execute electronic payment based on face authentication, the certain user may be erroneously authenticated as another user having a similar face, thereby inhibiting appropriate electronic payment from being executed. There is also a fear in that a malicious third party who does not use the first service may impersonate a user with a similar face to execute electronic payment through use of, for example, a credit card of this user.

In view of this, in Modification Example 6 of the present disclosure, electronic payment based on face authentication is permitted for a certain user as long as this certain user stays in a place checked in by the user. The number of humans staying in this area is limited, and hence it is extremely unlikely that anyone may have such a similar face that face authentication becomes successful. At the time of the check-in, secure confirmation of the identity of the user (so-called possession authentication) is performed through use of the user terminal 30, and hence a range of electronic payment based on face authentication is limited to the place checked in by the user, thereby being capable of guaranteeing security while enhancing the user convenience.

Figure 20:
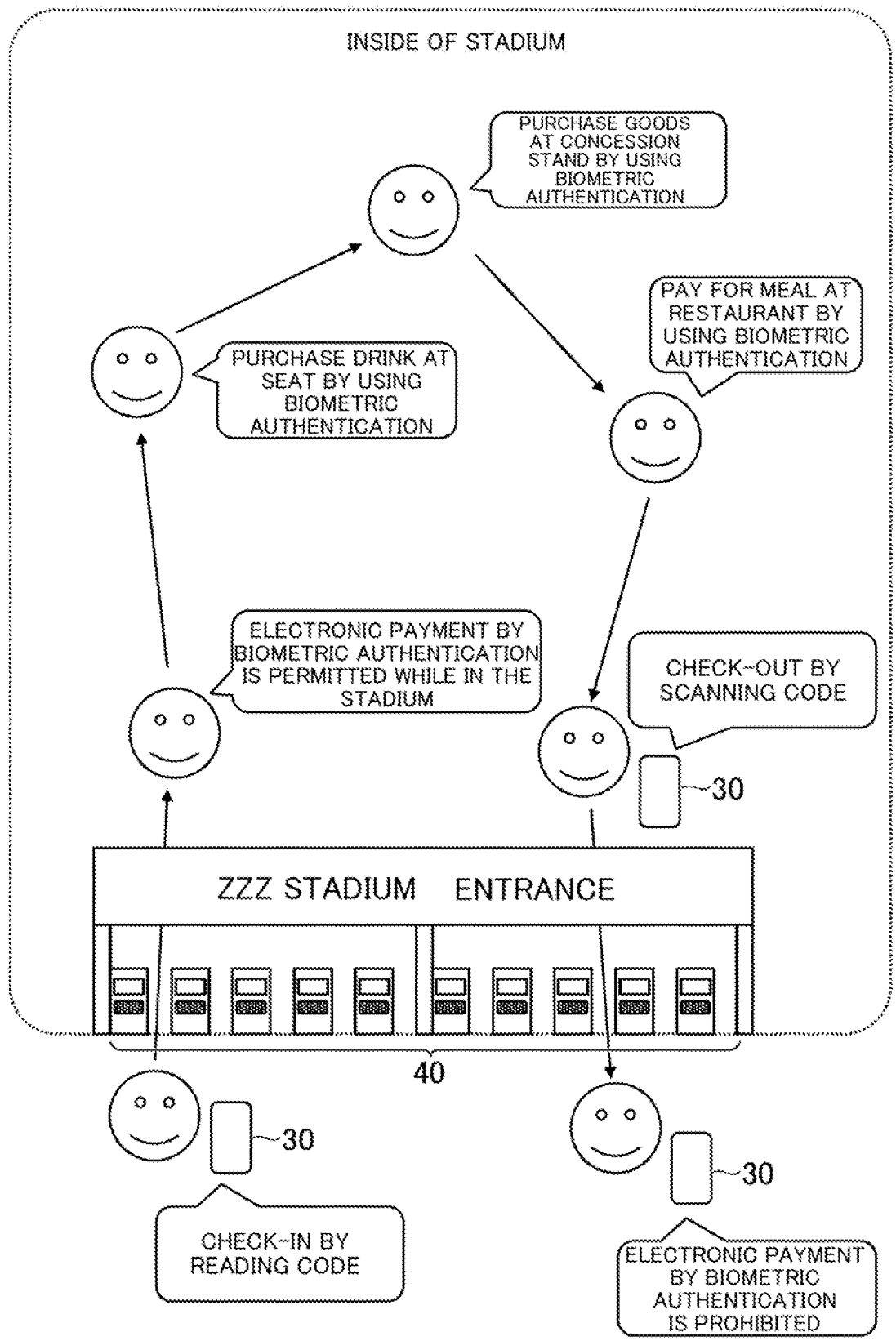
FIG. 20 is a diagram for illustrating an example of a check-in system according to Modification Example 6 of the present disclosure.

FIG. 20 is a diagram for illustrating an example of the check-in system S according to Modification Example 6. As illustrated in FIG. 20, when the user checks in to the stadium in the same manner as in the second embodiment, the payment terminals 50 that are arranged in the stadium enable the electronic payment based on the biometric authentication. Accordingly, the user is not required to cause the code C130 to be displayed.

The payment terminal 50 is an example of an authentication device. Accordingly, the payment terminal 50 as used herein can be read as "authentication device". The authentication device may be any device capable of biometric authentication. In Modification Example 6, a case in which the face authentication corresponds to the biometric authentication is described, but as the biometric authentication itself, any biometric authentication can be used. For example, fingerprint authentication, vein authentication, voiceprint authentication, or other authentication may be used.

The first database DB1 in Modification Example 6 stores authentication information to be used for the biometric authentication in association with the user ID. This authentication information is information being a correct answer in the biometric authentication, and may be, for example, a facial feature amount, a face photograph, a fingerprint pattern, a vein pattern, or a voiceprint pattern. The user uploads information (for example, face photograph) required for registering the authentication information onto the first server 10 at a time of setting the use of the first service. The first server 10 stores the authentication information in association with the user ID of this user based on the uploaded information.

The check-in system S according to Modification Example 6 includes the permission module 104. The permission module 104 permits, when the check-in has been executed, the electronic payment to be executed based on the biometric authentication in the stadium without the use of the user terminal 30. The first server 10 acquires, from the second server 20, the user ID of the user for which the check-in has been executed. Instead of acquiring this user ID from the second server 20, the first server 10 may hold, in the data storage unit 100, the user ID transmitted to the second server 20 at the time of the check-in.

For example, the permission module 104 associates the user ID of the user who has checked in to the stadium with information indicating that the electronic payment based on the biometric authentication has been permitted. The association therebetween may be held in the first database DB1, or may be held in another database. The first service providing module 103 executes the electronic payment for the user permitted to use the electronic payment based on the biometric authentication when the biometric authentication of this user is successful.

The first service providing module 103 does not execute the electronic payment based on the biometric authentication for the user who is not permitted to use the electronic payment based on the biometric authentication. The first service providing module 103 does not execute even for the user who is not permitted to use the electronic payment based on the biometric authentication even when a request for the electronic payment based on the biometric authentication is received from a computer outside the stadium. Even when another user who has a face similar to the face of the user who has checked in to the stadium is registered in the first database DB1, the another user has not checked in, and hence the information on the another user is not determined at a time of determination of the biometric authentication. Accordingly, the payment information including, for example, the credit card information on the another user is not used.

In the example of FIG. 20, when the user purchases a drink at the seat in the stadium, the user has his or her own face photographed by a camera of the payment terminal 50 held by a seller. The payment terminal 50 transmits the photographed image to the first server 10 together with its own terminal ID. When the first server 10 receives the terminal ID and the photographed image, the first service providing module 103 calculates the facial feature amount from the photographed image. The first service providing module 103 acquires the authentication information on the user who has checked in to the stadium among the pieces of authentication information stored in the first database DB1.

The first service providing module 103 executes the biometric authentication based on the calculated facial feature amount and the acquired authentication information. As the biometric authentication itself, a publicly known method can be used, and it suffices that success or failure is determined based on a similarity degree of the facial feature amounts. When biometric authentication other than the face authentication is used, a publicly known method can similarly be used as the biometric authentication itself. It suffices that the authentication information to be subjected to the determination at a time of the authentication is limited to only the authentication information on the user who has checked in.

The first service providing module 103 executes the electronic payment when the biometric authentication is successful. The first service providing module 103 refers to the first database DB1 to acquire the credit card information or other such payment information associated with the authentication information similar to the calculated facial feature amount. The first service providing module 103 executes electronic payment based on this payment information. As illustrated in FIG. 20, when the user purchases goods at a shop in the stadium and eats at a restaurant in the stadium, the electronic payment is similarly permitted only based on the face authentication.

The permission module 104 prohibits the electronic payment based on the biometric authentication when the user has checked out, when a predetermined time period has elapsed since the check-in, or when a predetermined time has arrived after the check-in. In the example of FIG. 20, when the user holds the code C130 or the like of the user terminal 30 over the check-in terminal 40 to check out, the permission module 104 updates the first database DB1 so as to inhibit the biometric authentication from being permitted.

According to Modification Example 6, when the check-in is executed, it is permitted to execute the electronic payment based on the biometric authentication in the stadium without the use of the user terminal 30, thereby being capable of enhancing the user convenience. In addition, a range in which the electronic payment based on the biometric authentication is permitted is limited to the inside of the stadium, thereby being capable of preventing erroneous authentication and impersonation and enhancing the security.

3-7. Modification Example 7

In Modification Example 7 of the present disclosure, a case in which the first service is an electronic payment service and the second service is a service provided by a karaoke business operator is described. When a user becomes a member of the karaoke business operator, the user can use a karaoke box at a member price. The user performs a registration procedure to become a member of the karaoke business operator by using the user terminal 30. The membership registration procedure may be performed from a computer other than the user terminal 30. When the user completes the membership registration procedure, the second server 20 manages the user ID in association with member information on the user in the second service. For example, information indicating whether or not the user is a member is stored in the second database DB2.

The check-in terminal 40 is arranged in a karaoke box shop. The user can check-in to the karaoke box as a guest user even when the user is not a member. When the user checks in to a karaoke box after becoming a member, the user can use the karaoke box at the member price. The check-in execution module 202 performs check-in based on the member information associated with the user ID. For example, the check-in execution module 202 executes check-in of the user so that the user can use the karaoke box at the member price when the member information associated with the user ID exists in the second database DB2. For example, the processing of notifying a shop terminal or the user terminal 30 that the user is a member corresponds to check-in. Further, for example, setting a fee as the basis of the amount to be spent by the user to the member price corresponds to check-in.

According to Modification Example 7, the user convenience can be enhanced by executing check-in based on the membership information on the user. For example, even when the user does not carry a large number of membership cards or install a large number of apps on the user terminal 30, the fact that the user is a member can be centrally managed by the first application.

3-8. Modification Example 8

For example, like in the second embodiment, when the user can use a predetermined service at each of a plurality of positions in the stadium, the spending amount by the user in the stadium may be displayed. In Modification Example 8 of the present disclosure, a case in which the service is the first service is described, but the service may be the second service or may be any third service different from the first and second services. The check-in system S of Modification Example 8 includes the spending amount acquisition module 105 and the information providing module 106.

The spending amount acquisition module 105 acquires a series of spending amounts in the stadium when check-in is executed. The spending amount acquisition module 105 acquires the spending amount of each item electronically paid for by the user from the first service after check-in is executed. In the example of FIG. 13, the spending amount acquisition module 105 acquires the spending amount of each of the purchase of a drink at his or her seat, the purchase of goods at a shop, and the payment for a meal at a restaurant. Each spending amount is transmitted from the payment terminal 50 to the first server 10. The first service providing module 103 stores a history of the execution result in the first database DB1 each time electronic payment is executed. The spending amount acquisition module 105 acquires the spending amount of each electronic payment after check-in by referring to the history.

Figure 21:
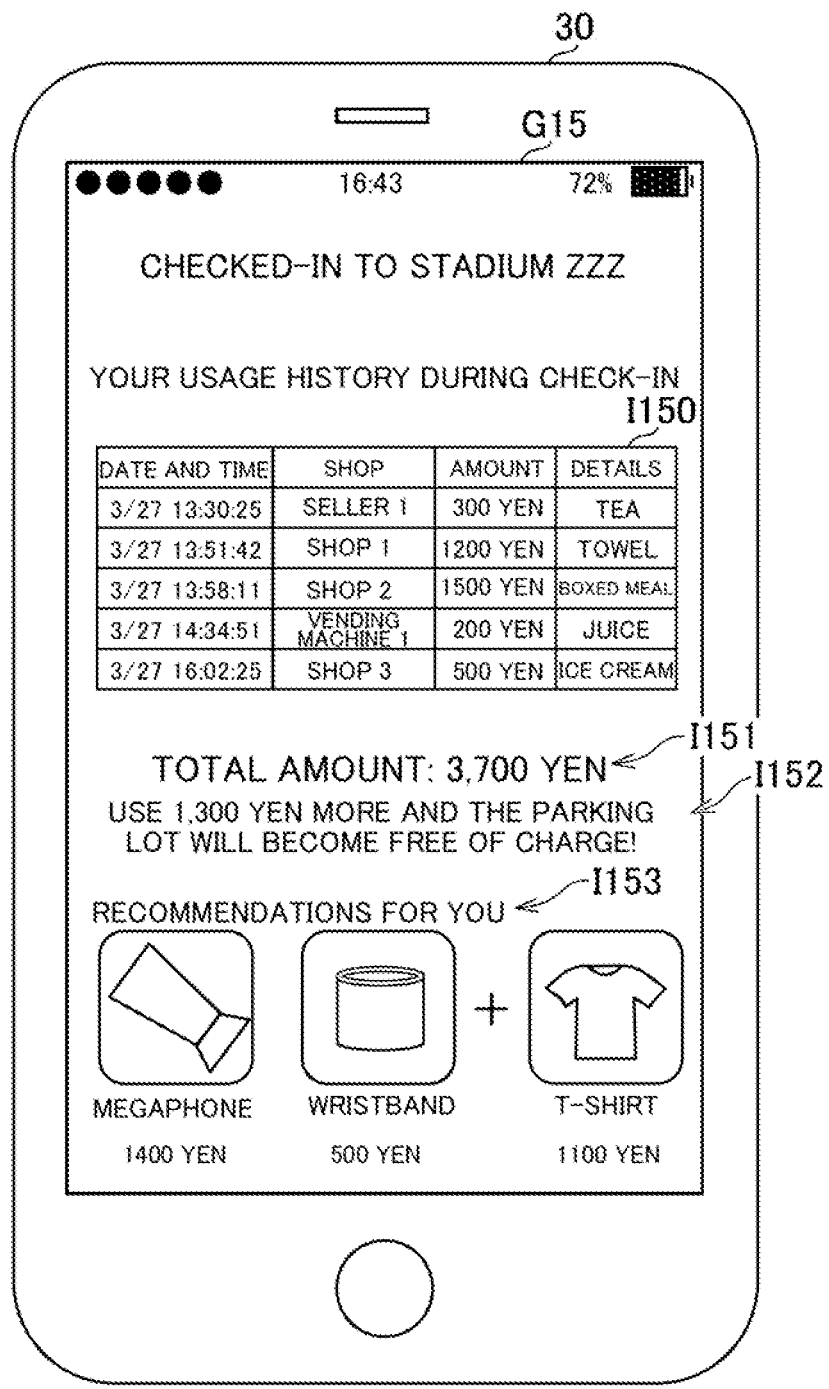
FIG. 21 is a diagram for illustrating an example of a screen to be displayed on a user terminal in Modification Example 8 of the present disclosure.

FIG. 21 is a diagram for illustrating an example of a screen displayed on the user terminal 30 in Modification Example 8. As illustrated in FIG. 21, the information providing module 106 provides information on the stadium to the user based on the spending amount acquired by the spending amount acquisition module 105. The information on the stadium may be any information corresponding to the spending amount, and may be, for example, the spending amount of each item, the total spending amount, a shortfall with respect to a predetermined amount, recommendation information corresponding to the spending amount, or coupon information corresponding to the spending amount. The data required for presenting those pieces of information is assumed to be stored in the first server 10 or another computer. In the example of FIG. 21, the information providing module 106 displays a provision screen G15 including, as information on the stadium, history information I150 on each spending amount in the stadium, total amount information I151, information I152 on a shortfall required for a parking lot to become free of charge, and recommendation information I153. In the recommendation information I153, products sufficient to achieve the shortfall required for the parking lot to become free of charge may be displayed.

According to Modification Example 8, when check-in is executed, useful information corresponding to the spending amount of a series of services can be provided by providing information on the stadium to the user based on a series of spending amounts in the stadium.

3-9. Modification Example 9

For example, in the second embodiment, the check-in system S may include the determination module 107 for determining, when check-in is executed, whether electronic payment relating to a series of uses at the stadium is to be executed each time or executed collectively depending on the user. The execution of electronic payment each time is as described in the second embodiment. In the case of executing the electronic payment collectively, the timing for executing electronic payment may be any time, for example, when the user checks out, when a predetermined duration has elapsed since check-in, or when a predetermined date and time is reached. In the case of executing the electronic payment collectively, the electronic payment is executed for the total amount of a plurality of spending amounts generated over a plurality of uses.

The first service providing module 103 executes the electronic payment based on the payment method determined by the determination module 107. For example, when it is determined by the determination module 107 that the electronic payment is to be executed each time, the first service providing module 103 executes electronic payment each time electronic payment is requested in the same manner as in the second embodiment. Further, for example, when it is determined by the determination module 107 that the electronic payment is to be executed collectively, the first service providing module 103 accumulates a plurality of uses in the first database DB1, and when the predetermined timing reached, is collectively executes electronic payment for the total amount.

According to Modification Example 9, when check-in is executed, the convenience of electronic payment in the stadium visited by the user can be enhanced by determining whether to execute the electronic payment for a series of uses in the stadium each time or collectively.

3-10. Modification Example 10

For example, the modification examples described above may be combined.

Further, for example, the first embodiment and the second embodiment may be combined, and check-in to a hotel may be performed from the first application for the user to use electronic payment. In this case, payment for meals, for example, purchased at the hotel during the period from the user checking-in to checking-out may be executed from the electronic payment of the first application. In this case, the electronic payment may be executed collectively at the time of checking-out, or the electronic payment may be executed each use. Moreover, for example, the check-in terminal 40 may transmit information such as the code ID directly to the second server 20 instead of transmitting the information to the second server 20 via the first server 10.

Further, for example, the case in which the check-in is executed by the user holding the user terminal 30 over the check-in terminal 40 has been described, but the check-in may be executed by causing the check-in terminal 40 to read some ID recorded on the IC chip 37 instead of using the image. Further, for example, the check-in may be executed only by any one of the user terminal 30 or the check-in terminal 40. For example, when a code posted in a place such as the hotel or the stadium or displayed on some computer is photographed by the photographing unit 36 of the user terminal 30, information that can identify this place and the code ID stored in the user terminal 30 may be transmitted from the user terminal 30 to the first server 10. In this case, the check-in terminal 40 is not required.

Further, for example, the check-in may be executed when the current position detected by the GPS reception unit 38 of the user terminal 30 has become near the hotel or the stadium. In this case, the check-in terminal 40 is not required. Further, for example, the check-in may be executed by the user reading the physical card or the magnetic card by the check-in terminal 40. In this case, the user terminal 30 is not required. As another example, the user may execute the check-in based on the biometric authentication from the check-in terminal 40. In this case as well, the user terminal 30 is not required.

Further, for example, the location relating to the second service may be a location at which an application entry such as a reservation does not occur. For example, the location may be a facility such as a shopping mall, a supermarket, a convenience store, a day-trip hot spring facility, a games arcade, or a department store. Users visit those facilities without performing a reservation in particular. It suffices that the user executes check-in from a check-in terminal 40 arranged in each of those facility based on a procedure similar to those in the first embodiment, the second embodiment, and the modification examples.

Further, for example, the first server 10 and the second server 20 are not required to be separately provided, and each of the functions may be implemented by one computer. Further, for example, the functions described as those implemented by the first server 10 may be shared by a plurality of computers. Further, for example, the functions described as those implemented by the second server 20 may be shared by a plurality of computers. Each of the functions may be implemented by at least one computer.

The invention claimed is:

1. A check-in system, comprising at least one processor configured to:
   acquire, when a user of a first service visits a location relating to a second service, first information for identifying the user in the first service by using at least one of a user terminal of the user or a check-in terminal of the location;
   store service-specific user identification information for the first service and the second service in separate databases, wherein the identification information comprises a user ID that identify the user in both the first service and the second service; maintain secure associations between first service information and second service information by managing a code ID and the user ID in association with each other using a first database;
   issue the code ID that is different from the user ID based on a predetermined ID issuance rule;
   acquire the user ID associated with the code ID and retrieve application entry information associated with the user ID;
   execute check-in to the location based on the first information or second information associated with the first information; and
   control, upon successful check-in execution, the check-in terminal to discharge a room key.

2. The check-in system according to claim 1,
   wherein the user terminal is configured to display a code including the first information based on a first application for using the first service, wherein the check-in terminal is configured to read the code, and wherein the at least one processor is configured to acquire the first information when the code is read by the check-in terminal.

3. The check-in system according to claim 2, wherein the user terminal is configured to display each of a first code for the first service and a second code for the second service, wherein the second code includes the first information, and wherein the at least one processor is configured to acquire the first information when the second code is read by the check-in terminal.

4. The check-in system according to claim 2, wherein the code is a code common to the first service and the second service, wherein the at least one processor is configured to:
provide the first service based on the first information when the common code is read by a first service terminal of the first service, and
acquire the first information when the common code is read by the check-in terminal.

5. The check-in system according to claim 2, wherein each of a plurality of the locations is visitable by the user, wherein the code is common to the plurality of the locations, and wherein the at least one processor is configured to acquire the first information when the common code is read by the check-in terminal.

6. The check-in system according to claim 2, wherein the location relating to each of a plurality of second services is visitable by the user, wherein the code is common to the plurality of second services, and wherein the at least one processor is configured to acquire the first information when the common code is read by the check-in terminal.

7. The check-in system according to claim 1, wherein the at least one processor is configured to:
receive an issuance request to issue the first information from the user terminal;
issue, when the issuance request is received, the first information and transmitting the first information to the user terminal,
receive the first information and record the first information in a storage of the user terminal, and
acquire the first information recorded in the storage.

8. The check-in system according to claim 1, wherein, before the user visits the location, the user performs an application entry for the location by using the second service, wherein a second server of the second service is configured to manage the first information or the second information in association with application entry information on the application entry, and wherein the at least one processor is configured to execute the check-in based on the application entry information associated with the first information or the second information.

9. The check-in system according to claim 8, wherein the second information is information for identifying the user in both the first service and the second service, wherein the second server is configured to manage the second information in association with the application entry information, wherein a first server of the first service is configured to manage the first information in association with the second information, wherein the first server is configured to transmit the second information associated with the first information to the second server, and wherein the second server is configured to execute the check-in based on the application entry information associated with the second information received from the first server.

10. The check-in system according to claim 8, wherein the user performs the application entry for each of a plurality of the locations, wherein the second server is configured to manage the first information or the second information in association with pieces of application entry information of the plurality of the locations, and wherein the at least one processor is configured to execute the check-in based on a piece of application entry information of the location visited by the user from among the pieces of application entry information of the plurality of the locations.

11. The check-in system according to claim 8, wherein the user performs the application entry for each of a plurality of dates and times, wherein the second server is configured to manage the first information or the second information in association with pieces of application entry information of the plurality of dates and times, and wherein the at least one processor is configured to execute the check-in based on a piece of application entry information of a date and time when the user visits the location from among the pieces of application entry information of the plurality of dates and times.

12. The check-in system according to claim 8, wherein the second service is a service for receiving an application entry of purchase of a ticket relating to the location, wherein the first user performs an application entry for a plurality of tickets by using the second service, wherein the second server is configured to manage the first information or the second information on the first user in association with the application entry information of each of the plurality of tickets, wherein the at least one processor is configured to:
associate the application entry information of a ticket of a second user from among the plurality of tickets with the first information or the second information on the second user, to thereby distribute the ticket to the second user,
acquire the first information on the first user when the first user visits the location, and to acquire the first information on the second user when the second user visits the location, and
execute the check-in of the first user based on the application entry information associated with the first information or the second information on the first user, and to execute the check-in of the second user based on the application entry information associated with the first information or the second information on the second user.

13. The check-in system according to claim 8, wherein the first service is a service for providing electronic payment, and wherein the at least one processor is configured to execute the electronic payment relating to the application entry.

14. The check-in system according to claim 1,
wherein the first service is a service for providing electronic payment,
wherein a predetermined service at the location is usable to the user, and
wherein the at least one processor is configured to execute, when the check-in is executed, the electronic payment relating to use at the location.

15. The check-in system according to claim 13,
wherein the first service is a service for providing the electronic payment using the user terminal,
wherein the location is a location at which an authentication device for executing biometric authentication of the user is arranged,
wherein the at least one processor is configured to permit, when the check-in is executed, execution of the electronic payment at the location based on the biometric authentication without using the user terminal.

16. The check-in system according to claim 1,
wherein a second server of the second service is configured to manage the first information or the second information in association with member information on the user in the second service, and
wherein the at least one processor is configured to execute the check-in based on the member information associated with the first information or the second information.

17. The check-in system according to claim 1,
wherein the first service is a service for providing electronic payment,
wherein a predetermined service is usable to the user at each of a plurality of positions at the location, and
wherein the at least one processor is configured to:
acquire a series of spending amounts at the location when the check-in is executed; and
provide information on the location to the user based on the spending amounts.

18. The check-in system according to claim 1,
wherein the first service is a service for providing electronic payment,
wherein a predetermined service is usable to the user at each of a plurality of positions at the location, and
wherein the at least one processor is configured to:
determine, when the check-in is executed, whether the electronic payment relating to a series of uses at the location is to be executed each time or executed collectively depending on the user; and
execute the electronic payment based on the determined method of payment.

19. The check-in system according to claim 1, wherein the code ID is automatically updated based on a predetermined expiration time.

20. A check-in method, comprising:
acquiring, when a user of a first service visits a location relating to a second service, first information for identifying the user in the first service by using at least one of a user terminal of the user or a check-in terminal of the location;
storing service-specific user identification information for the first service and the second service in separate databases, wherein the identification information comprises a user ID that identify the user in both the first service and the second service;
maintaining secure associations between first service information and second service information by managing a code ID and the user ID in association with each other using a first database;
issuing the code ID that is different from the user ID based on a predetermined ID issuance rule;
acquiring the user ID associated with the code ID and retrieving application entry information associated with the user ID;
executing check-in to the location based on the first information or second information associated with the first information; and
controlling, upon successful check-in execution, the check-in terminal to discharge a room key.

21. A non-transitory computer-readable information storage medium for storing a program for causing a computer to:
acquire, when a user of a first service visits a location relating to a second service, first information for identifying the user in the first service by using at least one of a user terminal of the user or a check-in terminal of the location;
store service-specific user identification information for the first service and the second service in separate databases, wherein the identification information comprises a user ID that identify the user in both the first service and the second service;
maintain secure associations between first service information and second service information by managing a code ID and the user ID in association with each other using a first database;
issue the code ID that is different from the user ID based on a predetermined ID issuance rule;
acquire the user ID associated with the code ID and retrieve application entry information associated with the user ID;
execute check-in to the location based on the first information or second information associated with the first information; and
control, upon successful check-in execution, the check-in terminal to discharge a room key.

* * * * *